(12) United States Patent
Sako et al.

(10) Patent No.: US 7,072,260 B1
(45) Date of Patent: Jul. 4, 2006

(54) DATA RECORDING MEDIUM, DATA REPRODUCING METHOD AND REPRODUCING DEVICE, AND DATA PROCESSING SYSTEM

(75) Inventors: Yoichiro Sako, Tokyo (JP); Masanobu Yamamoto, Kanagawa (JP); Takao Ihashi, Chiba (JP); Tatsuya Inokuchi, Kanagawa (JP); Kaoru Kijima, Tokyo (JP)

(73) Assignee: Sony Corporation (JP)

( * ) Notice: Subject to any disclaimer, the term of this patent is extended or adjusted under 35 U.S.C. 154(b) by 787 days.

(21) Appl. No.: 09/830,312
(22) PCT Filed: Aug. 25, 2000
(86) PCT No.: PCT/JP00/05769

§ 371 (c)(1),
(2), (4) Date: Apr. 4, 2001

(87) PCT Pub. No.: WO01/15164

PCT Pub. Date: Mar. 1, 2001

(30) Foreign Application Priority Data

Aug. 25, 1999 (JP) ............................. P11-239008
Feb. 2, 2000 (JP) ........................... P2000-030281

(51) Int. Cl.
*G11B 7/00* (2006.01)
(52) U.S. Cl. .................. 369/53.21; 369/59.25; 369/47.1; 369/47.12; 369/275.1
(58) Field of Classification Search ............ 369/47.1, 369/47.12, 47.13, 47.15, 47.21, 47.22, 47.46, 369/47.53, 53.1, 53.16, 53.2, 53.21, 59.1, 369/59.14, 59.25, 83, 84, 275.1
See application file for complete search history.

(56) References Cited

U.S. PATENT DOCUMENTS

| 6,084,736 | A   |   | 7/2000  | Kurokawa et al. ............. 360/71 |
| 6,622,132 | B1  | * | 9/2003  | Oshima et al. ................ 705/56 |
| 6,708,299 | B1  | * | 3/2004  | Xie ............................. 714/718 |
| 6,826,139 | B1  | * | 11/2004 | Oh et al. ................... 369/53.37 |
| 6,862,685 | B1  |   | 3/2005  | Gotoh et al. ................. 713/193 |

FOREIGN PATENT DOCUMENTS

| EP | 0785547  | 7/1997 |
| JP | 10188538 | 7/1998 |

* cited by examiner

*Primary Examiner*—Muhammad Edun
(74) *Attorney, Agent, or Firm*—Lerner, David, Littenberg, Krumholz & Mentlik, LLP

(57) ABSTRACT

A data recording medium on which digital data including work data such as a music tune or an image is recorded in a data recording area, and on which identification information enabling identification particular to the recording medium is recorded in an identification information recording area, whereas discrimination information indicating the presence/absence of the identification information is recorded in a lead-in area. The location of the digital data recorded on the recording medium is managed in accordance with the identification information for carrying out identification proper to the recording medium recorded on the recording medium, thus realizing multiple uses of the work data, such as duplication for a plurality of times.

71 Claims, 12 Drawing Sheets

| BOOKMARK URL | DOWNLOAD URL | INDIVIDUAL ID | ISRC | WORK DATA (CONTENTS) |
|---|---|---|---|---|

FIG.17

| $ID_1$ | $ID_2$ | .... | $ID_{20}$ | $URL_1$ | .... | $URL_5$ | ISRC | WORK DATA (CONTENTS) |
|---|---|---|---|---|---|---|---|---|

FIG.18

DATA RECORDING MEDIUM, DATA REPRODUCING METHOD AND REPRODUCING DEVICE, AND DATA PROCESSING SYSTEM

TECHNICAL FIELD

This invention relates to a data recording medium on which digital data including work data such as a music tune is recorded and on which identification information enabling identification proper to the recording medium is recorded, a reproducing method and device for reproducing the work data recorded on the data recording medium, and a data processing system for managing duplication of the work data recorded on the data recording medium.

BACKGROUND ART

Compact discs (CDs) are widely used as disc-shaped recording media on which digital data converted from audio data such as a music tune as work data is recorded and which enable reading of the data by optical reproducing means. A CD is a recording medium having a diameter of 12 cm and capable of recording data of not less than 600 MB. On such a CD, digital data is recorded on the basis of a standardized recording format. Based on the standard recording format of the CD, there are provided CD-ROMs on which data to be processed by computers or application software for television games is recorded, CD-Rs which enable writing of data once, CD-RWs which enable rewriting of data, and so on.

As data recording media on which digital data converted from image information of high quality or the like is recorded, DVDs (digital versatile discs) are provided.

CDs and DVDs are recording media which enable mass duplication and mass distribution of data from original discs. CDs and DVDs on which the same work data such as music tunes or video information is recorded have basically the same format, and each of the discs is housed and distributed in a container having a common form or design.

In order to identify so-called package media such that independent recording media having common work data recorded thereon are housed and distributed in respective common containers, serial numbers are printed on or seals having serial numbers printed thereon are attached to the containers housing the recording media or printed matters housed together with the recording media in the containers.

In the case where serial numbers are provided on the containers or the printed matters housed in the containers of the package media as described above, identification to discriminate other recording media of the same type cannot be carried out simply with the recording media themselves. In the case where seals having serial numbers printed thereon are peeled off or the containers or printed matters having serial numbers printed thereon are lost, the correspondence between the serial numbers and the recording media cannot be achieved and the serial numbers themselves cannot be recognized. Moreover, when recording media alone are handed to other people, it is difficult to manage the recording media.

In the case of the conventional package media that are widely distributed, once the package medium is sold to a user, the user can freely use the work data recorded on the recording medium but repeated duplication of the data read out from the recording medium is regulated. Therefore, providing the work data from the user who purchased the package medium to another user via a data distribution system such as the Internet is also regulated.

Moreover, as a method for distributing work data based on the contents such as music tunes, EMD (electronic music distribution) is used, which is a method utilizing the Internet. The work data distributed by this EMD is purchase-type data similar to the package media. The user can freely use the work data but repeated distribution or duplication of the once distributed data is regulated.

DISCLOSURE OF THE INVENTION

Thus, it is an object of the present invention to provide a data recording medium which enables identification between data recording media of the same type having the same work data recorded thereon, thus enabling secure management of the data recording media having the work data recorded thereon, and a data reproducing method and reproducing device for the data recorded on this data recording medium.

It is another object of the present invention to provide a data recording medium and a data processing system which enable multiple use of work data recorded on one data recording medium such as duplication for a plurality of times while realizing management of the location of the work data recorded on the data recording medium.

It is still another object of the present invention to provide a data processing system which enable protection of the interest of a copyright holder of work data recorded on a data recording medium and protection of the interest of an information provider who contributed to distribution of the work data.

A data recording medium according to the present invention has recorded thereon digital data including work data, and has recorded thereon in advance identification information which enables identification proper to the recording medium and discrimination information indicating the presence/absence of the identification information.

The identification information which enables identification proper to the recording medium is information which enables identification to discriminate from other recording media, and the identification information includes information for identifying individual contents constituting the work data recorded on the recording medium.

As management of the work data recorded on the recording medium is carried out on the basis of the identification information recorded on the recording medium for carrying out identification proper to the recording medium, even when the work data is transmitted or duplicated onto another recording medium, management of location of the work data recorded on the original recording medium can be securely carried out and duplication of the work data or the like can be easily managed.

In a data reproducing method and device for reproducing a data recording medium according to the present invention, discrimination information indicating whether identification information recorded on the data recording medium for carrying out identification proper to the recording medium exists or not is read out, and when it is discriminated by the discrimination information that the identification information exists, the identification information is read out. The data reproducing method is controlled in accordance with the result of discrimination by the discrimination information, and reproduction of second digital data recorded by a recording method different from the recording method of first digital data is made possible.

The present invention also provides a system which enables repeated duplication of data recorded on a data recording medium having digital data recorded thereon and having recorded thereon in advance identification information enabling identification proper to the recording medium and discrimination information indicating the presence/absence of the identification information. The system comprises: information providing means for providing information obtained by duplicating at least the digital data recorded on the data recording medium and then adding information provider identification information to the duplicated digital data; access means for accessing the information providing means to download at least the digital data duplicated from the data recording medium, having the information provider identification information added thereto and recorded in the information providing means; and work data managing means to which the information provider identification information generated by the information providing means and the information provider identification information downloaded by the access means are transmitted.

When at least the information provider identification information downloaded from the information providing means is transmitted from the access means, the work data managing means performs accounting to reproducing means, and collates the information provider identification information transmitted from the information providing means and the information provider identification information transmitted from the access means and totals the coincident information provider identification information. The work data managing means provides compensation to the information providing means in accordance with the quantity of coincidence between the information provider identification information transmitted from the information providing means and the information provider identification information transmitted from the access means.

The present invention also provides a system which enables repeated distribution of work data recorded on a data recording medium having the work data recorded thereon and having recorded thereon in advance identification information enabling identification proper to the recording medium and discrimination information indicating the presence/absence of the identification information. The system comprises: information providing means for providing information obtained by duplicating at least digital data recorded on the data recording medium and then adding information provider identification information to the duplicated digital data; access means for accessing the information providing means to download at least the digital data duplicated from the data recording medium, having the information provider identification information added thereto and recorded in the information providing means; and work data managing means to which the information provider identification information generated by the information providing means and the information provider identification information downloaded by the access means are transmitted.

The present invention further provides an information transmitting device comprising: at least one terminal section for reproducing a recording medium having recorded thereon first digital data related to a work and second digital data including identification information proper to the medium and address data indicating a homepage address; and at least one server section connected to the terminal section via a communication channel and designated by the address data. The server section of the device identifies the identification information of the recording medium supplied from the terminal section via the communication channel, and permits downloading of the digital data related to the work to the terminal section when the result of identification indicates that the terminal section is a normal terminal section.

The present invention further provides an information transmitting method for transmitting identification information of a recording medium from at least one terminal section for reproducing a duplicate recording medium duplicated from the recording medium having recorded thereon first digital data related to an encrypted work and second digital data including at least identification information proper to the medium, to a host section via a communication channel. The method comprises the steps of: authenticating, at the host section, the identification information proper to the recording medium transmitted thereto; requesting the terminal section for accounting; and transmitting data related to a key for decryption of the first digital data to the terminal section when accounting is carried out.

The terminal section reproduces the first digital data on the duplicate recording medium on the basis of the data related to the key transmitted thereto.

The host section totals the identification information proper to the recording medium transmitted from the terminal section, then totals the quantity of duplication for each recording medium, and calculates the distribution rate for distributing at least a part of the fee collected by accounting to the owner of the recording medium.

Other objects and advantages of the present invention will be clarified further from the following description of embodiments.

BRIEF DESCRIPTION OF THE DRAWINGS

FIG. 17 shows a recording format of data obtained by duplication from data recorded on the disc-shaped recording medium according to the present invention.

FIG. 18 shows another example of the recording format of data obtained by duplication from data recorded on the disc-shaped recording medium according to the present invention.

BEST MODE FOR CARRYING OUT THE INVENTION

A data recording medium according to the present invention, a data reproducing method and device for reproducing data recorded on the data recording medium, and a data processing system for duplicating and distributing work data recorded on the data recording medium will now be described.

Figure 1:
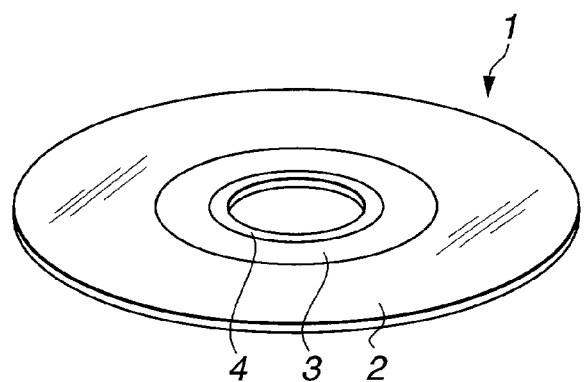
FIG. 1 shows the schematic structure of a disc-shaped recording medium according to the present invention.

First, the data recording medium according to the present invention will be described. This data recording medium is a disc-shaped recording medium 1 and has a data recording area 2 in which main data such as work data or the like based on contents such as a music tune is recorded and a lead-in area 3 provided on the inner side than the data recording area 2. Moreover, an identification information recording area 4 in which identification information enabling identification proper to the recording medium is recorded is provided on the inner side than the lead-in area 3 as shown in FIG. 1.

More specifically, first digital data recorded in a recording format which is conventionally used for CDs (compact discs) and DVDs (digital versatile discs) and second digital data recorded in a recording format different from the recording format of the first digital data are recorded on the disc-shaped recording medium 1.

The first digital data is work data based on contents such as a music tune or an image and constitutes main data recorded on the disc-shaped recording medium 1. The second digital data is combined with the first digital data to form audio data of high quality or constitutes a part of work data recorded as the first digital data, for example, data of either a song or a music tune when the work data includes both. The second digital data may be compressed audio data or image data, or text data. The specific contents of the data may be a poster, jacket, lyrics, liner notes, interview article, information of a new song and the like, attached to the first digital data. When the first digital data is work data related to audio data, the second digital data is lot information for concert tickets with respect to the performer of the work, Internet live viewing information or the like. The second digital data also includes data related to the distribution source for supplying the work data corresponding to the first digital data, or URL (homepage address) as the address of the writer including the performer via a communication network such as the Internet.

The second digital data, added to the first digital data and thus recorded, is recorded by changing the shape of recording pits constituting the first digital data or the position in the direction orthogonal to the direction of recording tracks of the recording pits. Therefore, the second digital data can be reproduced without affecting the data reproduction of the first digital data. That is, when a reproducing device capable of reproducing only digital data compatible with the recording format of the first digital data is used, reproduction of the first digital data alone is possible, and when a reproducing device capable of reproducing the second digital data as well as the first digital data is used, reproduction of the first and second digital data is possible. Thus, upward compatibility is guaranteed. Specifically, the first digital data is recorded by so-called pit edge recording in which the data is modulated by the edge or length in the longitudinal direction of the recording track of the recording pits, while the second digital data is recorded by displacing the recording pits in the tracking direction of the direction of track width orthogonal to the recording tracks or by changing the width of the recording pits in the direction of track width. When reproducing the first digital data by using the reproducing device capable of reproducing only the first digital data, the quantity of changes of the position and shape of the recording pits is limited to a range of errors which enables reading of the first digital data and which does not affect the reproduction of the first digital data.

On the disc-shaped recording medium 1 according to the present invention on which the first digital data and the second digital data having the different recording format from that of the first digital data are recorded, identification information proper to the recording medium or individual ID data for identifying individual recording media is recorded. The identification information or individual ID data is recorded in a recording format which can be read by an optical head for recording the first and second digital data. In the example of FIG. 1, the identification information or individual ID data is recorded in the identification information recording area 4 provided on the inner side than the lead-in area 3 provided on the inner side than the data recording area 2 in which at least the first digital data is recorded.

The recording area for the identification information or individual ID data is not limited to the identification information recording area 4 provided on the inner circle on the disc-shaped recording medium 1. The identification information or individual ID data may also be recorded in an area outer than a lead-out area provided on the outer side than the data recording area 2 in which at least the first digital data is recorded, or in a part of the lead-in area. With respect to read-only optical discs on which data is recorded on the basis of the recording format of CD and DVD, mass production of the same type of discs is carried out by using a stamper for transferring recess/protrusion patterns corresponding to digital data to be recorded. Thus, the identification information or individual ID data is recorded by writing directly onto a reflection film of each recording medium at or around the final step of the manufacturing process for the recording medium. The manufacturing method for the disc-shaped recording medium on which the individual identification information or individual ID data is recorded will be described later.

Figure 2:
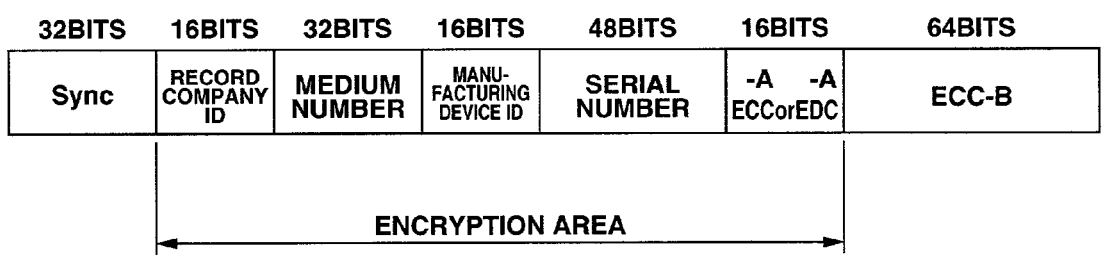
FIG. 2 illustrates an example of the recording format of individual ID data, which is identification information for carrying out identification proper to the disc-shaped recording medium.

The individual identification information or individual ID data recorded on the above-described disc-shaped recording medium 1 is recorded on the basis of a recording format as shown in FIG. 2. In FIG. 2, for example, leading 32 bits form a synchronization (Sync) part and an area subsequent to the synchronization part is a recording part in which the individual identification information or individual ID data is recorded. The individual identification information or individual ID data recorded in the recording part has its information converted, more specifically, encrypted and then recorded. Therefore, the recording part in which the individual identification information or individual ID data is recorded is an encryption area. The encryption area is constituted by, for example, a total of 128 bits including record company ID data of 16 bits, medium number of 32 bits, manufacturing device ID data of 16 bits, serial number of 48 bits, and an error correction code (ECC-A) or error detection code (EDC-A) of 16 bits.

The record company ID data is information specifying the copyright holder who owns or administers the copyright for producing or supplying each content such as music constituting the work data recorded on the disc-shaped recording medium. The medium number is used for carrying out distribution and registration of the disc-shaped recording medium. The manufacturing device ID data is information specifying the device for manufacturing the disc-shaped recording medium, and is also information identifying the manufacturing device for recording the 48-bit serial number. The manufacturing device ID data itself is also used as a part of information of the individual ID data for carrying out identification proper to the disc-shaped recording medium. The 48-bit serial number is a main part of the identification information or individual ID data for identifying individual disc-shaped recording media. The serial number can be freely allocated by the first record company that distributes the recording medium and need not be consecutive numbers. Following the encryption area, for example, an error correction code (ECC-B) of 64 bits is provided. Thus, a total 224 bits are provided as a whole including the leading synchronization part.

As for the 16-bit error correction code (ECC-A) or error detection code (EDC-A), for example, a generating polynomial is generated by a CRC (cyclic redundancy code) as follows.

$$g(x)=x^{16}+x^{12}+x^5+1$$

This generating polynomial g(x) may be arbitrarily set by the first record company that distributes the disc-shaped recording medium. Thus, haphazard "bit strings" can be securely eliminated. The purpose of this code is different from that of the 64-bit error correction code (ECC-B) and this code is used for authentication of the individual ID data, instead of original error correction or error detection. That is, whether such individual ID data exists or not can be discriminated.

As for the 64-bit error correction code (ECC-B), for example, the following generating polynomial is used.

$$f(x)=x8+x4+x3+x2+1$$

In the case of f(á)=0, the following (24, 16, 9) Reed-Solomon code is used.

$$G(x)=(x+1)(x+á)(x+á2) \ldots (x+á7)$$

This code has the correction capability which enables detection and correction of 4 bytes or extinction and correction of 8 bytes.

In short, of the two or more error correction codes (ECCs) or error detection codes (EDCs), one is used for original error correction and error detection and the other is used for authentication of the identification information or individual ID data for carrying out identification proper to the disc-shaped recording medium.

The data of, for example, 128 bits, recorded in the encryption area and indicating the identification information or individual ID data is protected from stealing as it is encrypted in accordance with a common key system such as the RSA (Rivest, Shamir and Adleman) public key system or the DES (data encryption standard) system.

The format of the individual ID data shown in FIG. 2 is only an example, and the number of bits and arrangement of each area can be arbitrarily set and the number of kinds of areas may be increased or decreased. For example, work ID data specifying the individual work data recorded on the disc-shaped recording medium 1 may be recorded. The work ID data is recorded in accordance with ISRC (International Standard Recording Code).

Moreover, by writing a part of the information of the individual ID data, for example, the manufacturing device ID data, into a predetermined part of the second digital data recorded in the data recording area 2 provided on the disc-shaped recording medium 1 shown in FIG. 1, the safety and reliability of illegal copy prevention or the like can be improved.

Furthermore, presence/absence discrimination information indicating whether the individual ID exists or not is recorded at a predetermined position, for example, in a user area or the like, in the lead-in area 3 on the disc-shaped recording medium 1 shown in FIG. 1. This information may be used as the presence/absence discrimination information for the individual ID data or as discrimination information indicating whether or not the recording medium is a recording medium such that the second digital data of the different recording format from that of the first digital data is added to the first digital data. Conversely, the discrimination information indicating whether or not the recording medium is a recording medium such that the second digital data of the different recording format from that of the first digital data is added to the first digital data may be used as the presence/absence discrimination information for the individual ID data. Such information may be collectively recorded as one piece of discrimination information.

The reproducing device according to the present invention using the disc-shaped recording medium 1 on which first digital data and second digital data of a recording format different from that of the first digital data are recorded and on which identification information or individual ID data proper to the recording medium is recorded, as shown in FIG. 1, will now be described.

Figure 3:
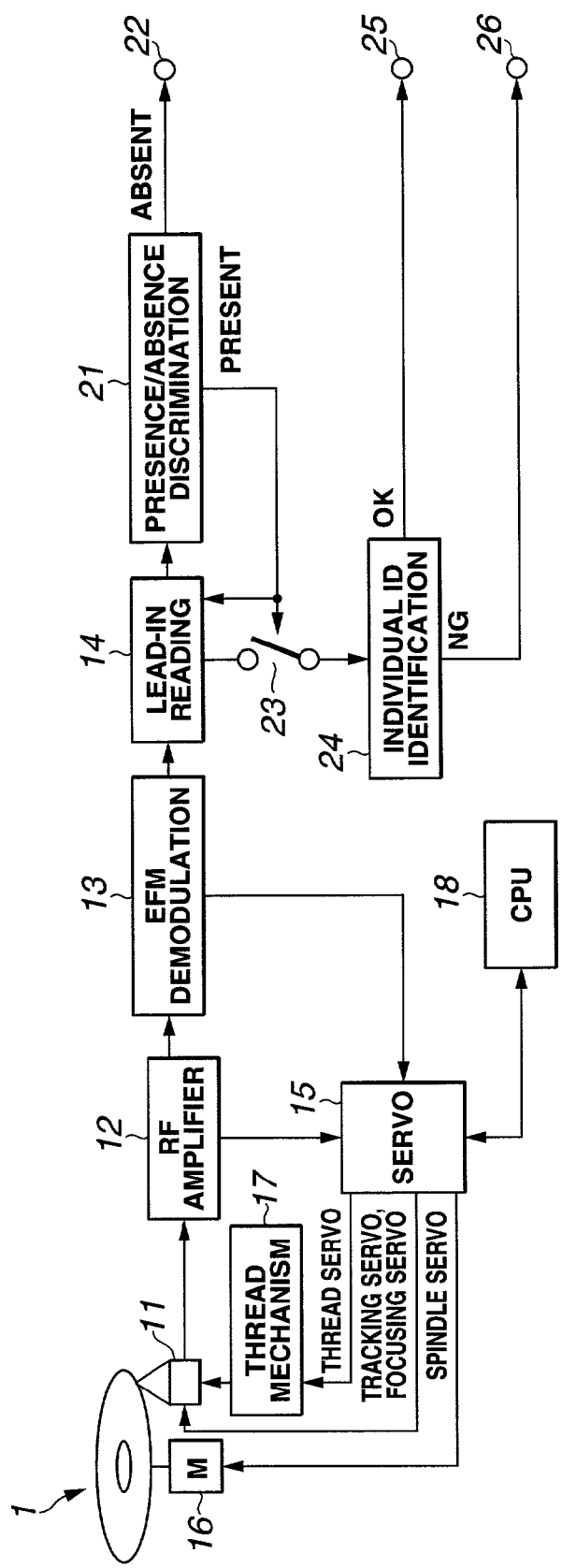
FIG. 3 is a block diagram showing the schematic structure of a reproducing device used for reproduction of the disc-shaped recording medium according to the present invention.

As shown in FIG. 3, the reproducing device has an optical head 11 for scanning the area where data is recorded on the disc-shaped recording medium 1 which is loaded on this device and rotationally driven by a spindle motor 16, and thus reading out the data recorded on the recording medium 1. The data recorded on the disc-shaped recording medium 1 and read out by the optical head 11 is supplied to an RF amplifier 12. A reproduction RF signal outputted from the RF amplifier 12 is sent to and EFM-demodulated by an EFM (eight-to-fourteen modulation) demodulation circuit 13 and then sent to a lead-in reading circuit 14. Various signals for servo such as a tracking error signal and a focusing error signal outputted from the RF amplifier 12 and a reproduction clock signal from the EFM demodulation circuit 13 are supplied to a servo circuit 15, and various servo signals such as a tracking servo signal and a focusing servo signal are outputted from the servo circuit 15. A spindle servo signal outputted from the servo circuit 15 is supplied to the spindle motor 16 for rotational driving of the disc. The tracking servo signal and the focusing servo signal are supplied to an actuator of the optical head 11, thus carrying out tracking servo and focusing servo. A thread servo signal is supplied to a thread driving motor of a thread mechanism 17 for moving the optical disc 11 in the radial direction of the disc-shaped recording medium. Between the servo circuit 15 and a CPU (processor unit) 18, control commands and control data are transmitted and received, for example, via a bus.

The lead-in reading circuit 14 supplies the data read out from the lead-in area 3 on the disc-shaped recording medium 1 by the optical head 11 to a presence/absence discrimination circuit 21. The presence/absence discrimination circuit 21 discriminates whether or not discrimination information indicating the presence/absence of individual ID data for carrying out identification proper to the recording medium is included in the data read out from the lead-in area 3. In the case where the presence/absence discrimination circuit 21 determined that the discrimination information is absent, the reproducing device shown in FIG. 3 identifies the disc-shaped recording medium loaded thereon as a disc-shaped recording medium on which only the first digital data in accordance with the recording format based on the CD or DVD format is recorded. The reproducing device carries out reproduction of the data on the disc-shaped recording medium loaded thereon and outputs the reproduced data from an output terminal 22.

In the case where the presence/absence discrimination circuit 21 determined that the discrimination information is present, the reproducing device supplies a control signal to the lead-in reading circuit 14 so as to move the optical head 11 again to the innermost circle on the disc-shaped recording medium 1, thus reading out the information recorded in the lead in area 3. At the same time, the reproducing device turns on a switch 23 for selecting a reproduction mode and supplies a signal including the individual ID data supplied from the lead-in reading circuit 14 to an individual ID identification circuit 24. In this example, it is assumed that the individual ID data or identification information is also recorded in the lead-in area 3. However, in the case where the individual ID data or identification information is recorded in the identification information recording area 4 provided on the inner side than the lead-in area 3 as in the disc-shaped recording medium 1 shown in FIG. 1, the reproducing device reads out the information recorded in the identification information recording area 4 and sends the information to the individual ID identification circuit 24. The individual ID identification circuit 24 discriminates whether the individual ID data is normally identified or not. When the read-out individual ID data is normally identified (OK), the second digital data recorded on the disc-shaped recording medium 1 is reproduced in addition to the first digital data and the reproduced data is outputted from a first output terminal 25. When the individual ID data cannot not be normally identified (NG), a digital data reproduction prohibition signal is outputted from a second output terminal 26.

Figure 4:
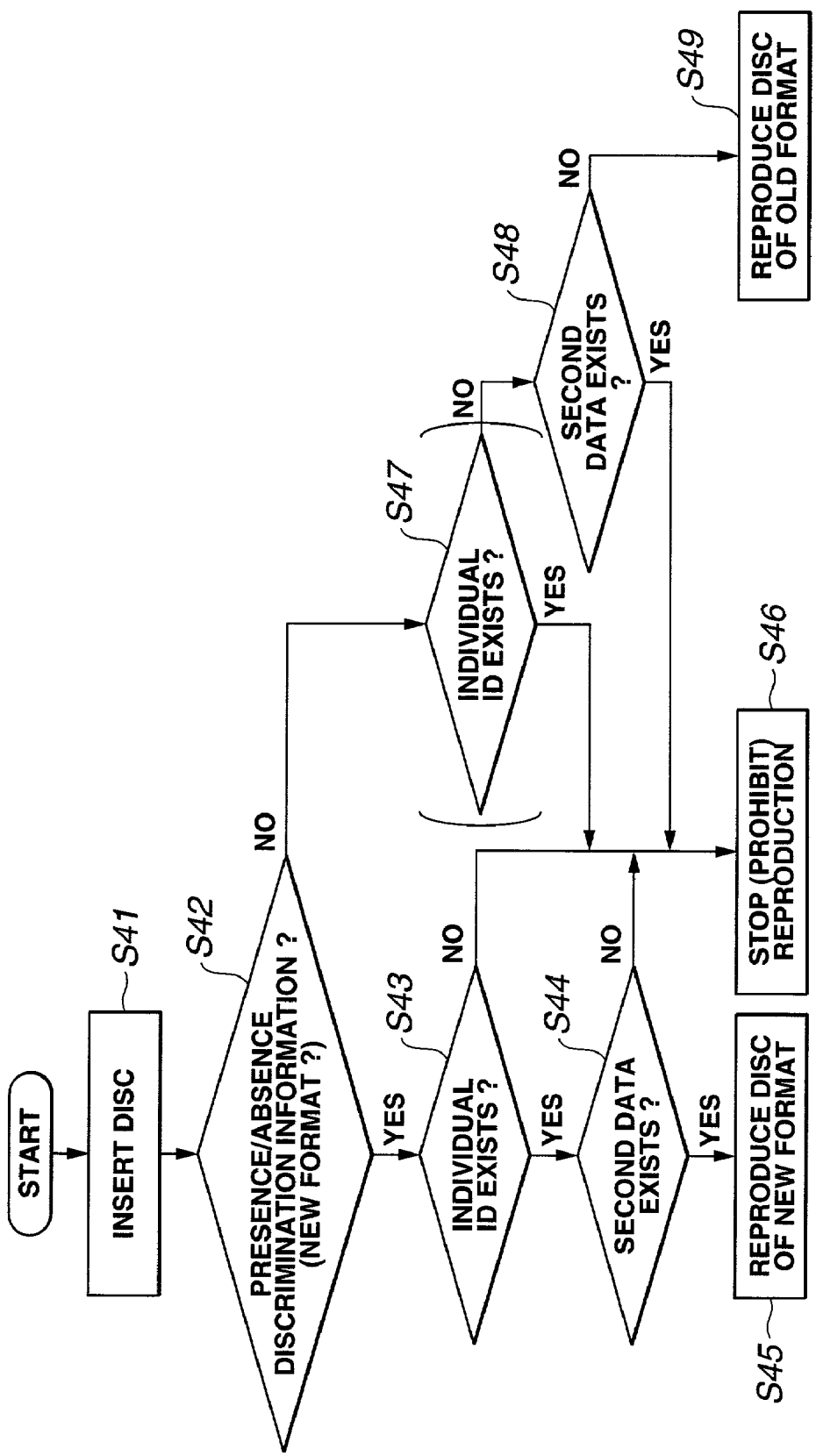
FIG. 4 is a flowchart for explaining the procedure for reproducing data recorded on the disc-shaped recording medium according to the present invention.

The reproducing operation of the reproducing device according to the present invention will be described further in detail with reference to FIG. 4.

First, at step S41, the disc-shaped recording medium 1 is loaded on the reproducing device and the lead-in area 3 on the loaded disc-shaped recording medium 1 is accessed by the optical head 11, thus reading out the information recorded in the lead-in area 3. At step S42, the discrimination information indicating the presence/absence of individual ID data is discriminated by the presence/absence discrimination circuit 21. When it is determined that the discrimination information is present, the processing goes to step S43. When it is determined that the discrimination information is absent, the processing goes to step S47.

At step S43, whether the individual ID data exists or not is discriminated by the presence/absence discrimination circuit 21 on the basis of the discrimination information. When the result is YES, the processing goes to step S44. When the result of discrimination at step S43 is NO, the processing goes to step S46 to stop or prohibit the reproduction mode of data corresponding to the work data. Although the discrimination at step S43 may be only the discrimination as to whether the individual ID data is actually written or not, whether the individual ID data is normally recognized or not may also be discriminated by using the error correction code (ECC-A) and the error detection code (EDC-A) in the case where the individual ID data has the format shown in FIG. 2. At step S44, it is discriminated by the presence/absence discrimination circuit 21 whether or not the second digital data having the different recording format from that of the first digital data is present on the loaded disc-shaped recording medium 1. When the result is YES, the processing goes to step S45 to select the reproduction mode for reproducing the disc-shaped recording medium 1 according to the present invention on which the first and second digital data are recorded, thus reproducing the first and/or second digital data. When the result of discrimination at step S44 is NO, the processing goes to step S46 to stop or prohibit the reproduction mode.

The discrimination at step S44 as to whether or not the second digital data is recorded on the loaded disc-shaped recording medium 1 can be carried out, for example, by detecting the presence/absence of a level change in a signal which is obtained by taking the differential of detection signals from two photodetector sections of a photodetector of the optical head 1 having a boundary parallel to the recording track, that is, a so-called push-pull signal.

At step S47, whether the individual ID data exists or not is discriminated by the presence/absence discrimination circuit 21. When the result is YES, the processing goes to step S46 to stop the reproduction mode. When the result is NO, the processing goes to step S48. At step S48, it is discriminated whether or not the second digital data recorded in the different recording format from that of the first digital data is present in addition to the first digital data on the loaded disc-shaped recording medium 1, for example, by using a method similar to the discrimination method of step S44. When the result is YES, the processing goes to step S46 to stop the reproduction mode. When the result is NO, the processing goes to step S49 to select the reproduction mode for reproducing the first digital data, thus reproducing the data recorded on the disc-shaped recording medium 1.

Steps S47 and S48 are steps for stopping or prohibiting the reproduction of data when the individual ID data and the second digital data are duplicated in the case where duplication of data is carried out from the disc-shaped recording medium on which the second digital data is recorded in the different recording format from that of the first digital data in addition to the digital data. One or both of these steps may be omitted.

As a specific example of the discrimination operation at step S43 and the like with respect to whether the individual ID data exists or not, the operation to discriminate whether the individual ID data is normally recognized or not, in the case where the format of the individual ID data or identification information shown in FIG. 2 is used, will now be described in detail with reference to FIG. 5.

Figure 5:
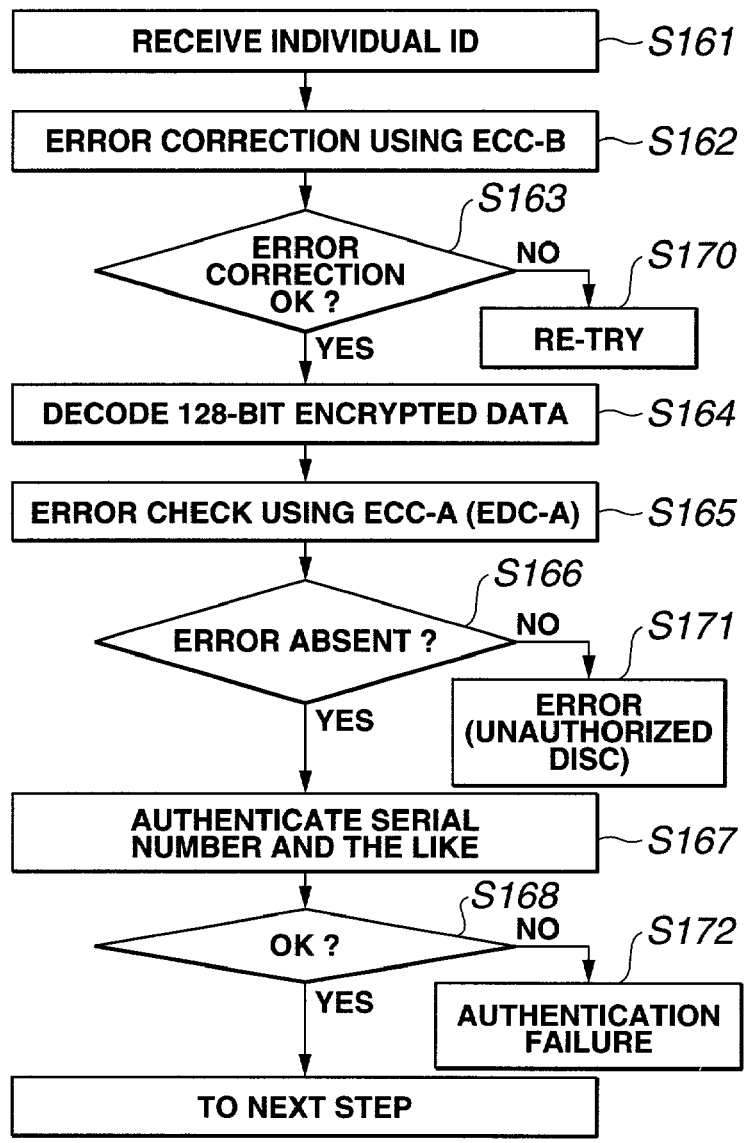
FIG. 5 is a flowchart for explaining the procedure for authenticating the individual ID.

At step S161 shown in FIG. 5, the individual ID data or identification information of the format shown in FIG. 2 is inputted to or received by the reproducing device shown in FIG. 3. Then, at the next step S162, error correction using the error correction code (ECC-B) is carried out, and at step S163, whether the error correction normally ended or not is discriminated. When the result is YES, that is, when it is determined that the error correction was normally made, the processing goes to step S164. When the result is NO, the processing goes to step S170 to make retrial. At step S164, the 128-bit encrypted data in the encryption area shown in FIG. 2 is decoded and the processing goes to step S165 to carry out error check using the 16-bit error correction code (ECC-A) or error detection code (EDC-A).

At step S166, whether an error is absent or not as a result of the error check using the error correction code (ECC-A) or error detection code (EDC-A) is discriminated, that is, authentication of the individual ID data is carried out. When the result of discrimination at step S166 is NO (an error exists), the processing goes to step S171 to carry out processing for the case of an error. That is, it is recognized that unauthorized duplication is made on the data recorded on the loaded disc-shaped recording medium 1, for example, the first digital data, and reproduction prohibition processing for the loaded disc-shaped recording medium 1 is carried out. When the result of discrimination at step S166 is YES (no error exists), that is, when authentication of the individual ID data is normally carried out, the processing goes to step S167 to carry out authentication or confirmation of the serial number and the like of the individual ID data shown in FIG. 2. At step S168, it is discriminated whether or not authentication of the data such as the serial number and the like of the individual ID data is normally carried out at step S167. When the result is NO, processing for the case of authentication failure is carried out at step S172. When the result is YES, the processing goes to the next step. A series of operation shown in FIG. 5 is equivalent to, for example, the operation at step S43 in FIG. 4, and when the result of discrimination at step S168 is YES, the processing goes to the next step S44 shown in FIG. 4.

Figure 6:
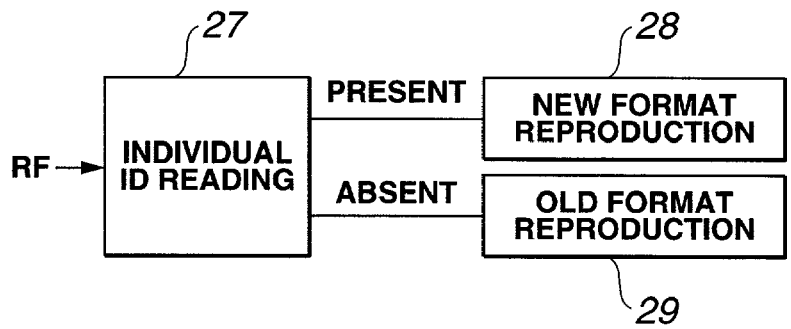
FIG. 6 illustrates an example in which the individual ID is directly read out to switch the reproducing operation.

In the above description, the presence/absence discrimination information indicating whether the individual ID data exists or not is recorded on the disc-shaped recording medium. However, such presence/absence discrimination information is not necessarily needed. For example, in the case where the recording position of the individual ID data on the disc-shaped recording medium is predetermined, the individual ID data may be directly read out. FIG. 6 shows an essential portion of such an example.

Specifically, in FIG. 6, a reproduction RF signal is supplied to an individual ID reading circuit 27, and if the individual ID data read out by the individual ID reading circuit 27 is present, reproduction is carried out by a new format reproducing system 28 which reproduces the disc-shaped recording medium according to the present invention on which the second digital data having the different recording format from that of the first digital data is recorded in addition to the first digital data. If the individual ID data is absent, that is, if the individual ID data is not recorded on the loaded disc-shaped recording medium 1, reproduction is carried out by an old format reproducing system 29 which reproduces a disc-shaped recording medium such as a CD or DVD on which only the first digital data is recorded or which reproduces only the first digital data. FIG. 6 illustrates the concept of selecting the reproducing system of the reproducing device in accordance with the presence/absence of the individual ID data. The new format reproducing system 28 and the old format reproducing system 29 need not be provided as independent systems in one reproducing device, and the new format reproducing system 28 may also have the function of the old format reproducing system 29.

Meanwhile, it is also possible to record, onto the disc-shaped recording medium, additional discrimination information indicating whether or not the second digital data of the different recording format from that of the first digital data is recorded in addition to the first digital data on the disc-shaped recording medium, and discriminate the presence/absence of the individual ID data in accordance with the additional discrimination information. Moreover, it is possible to determine that the second digital data is recorded by a predetermined recording method using a recording pit different from that of the recording method for the first digital data, for example, by a method of changing the shape or position of the recording pit in the direction of track width, so as to discriminate the type of the disc-shaped recording medium, and thus discriminating the presence/absence of the individual ID data, instead of recording the additional discrimination information indicating the presence/absence of the recording of the second digital data onto the disc-shaped recording medium.

The procedure for manufacturing a disc on which the discrimination information or individual ID data is recorded as described above will now be described with reference to FIG. 7.

Figure 7:
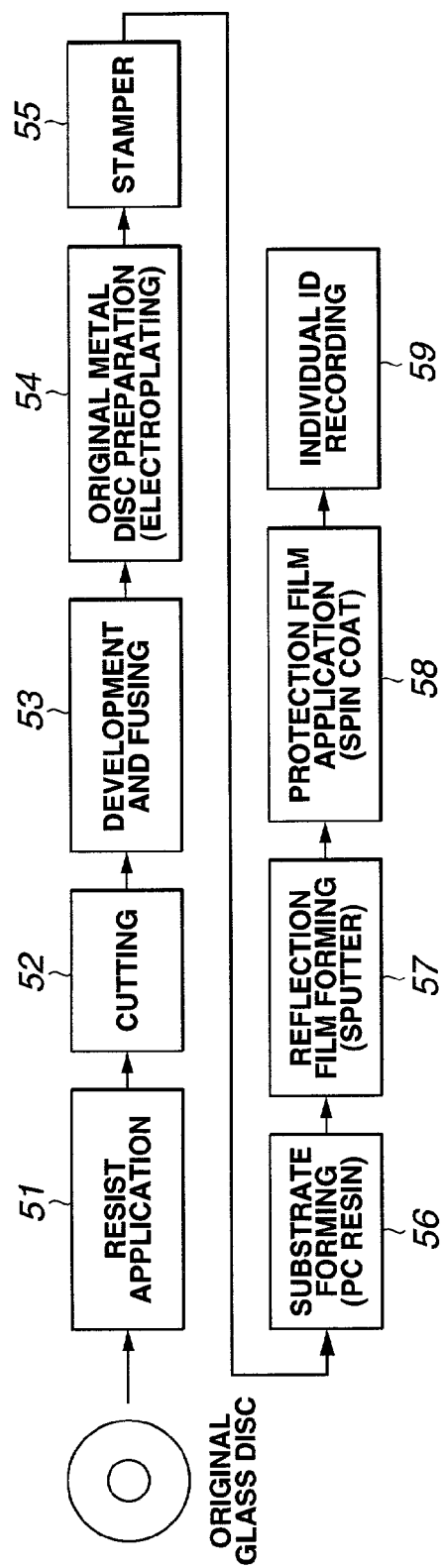
FIG. 7 illustrates an example of the procedure for manufacturing the disc-shaped recording medium according to the present invention.
Figure 8:
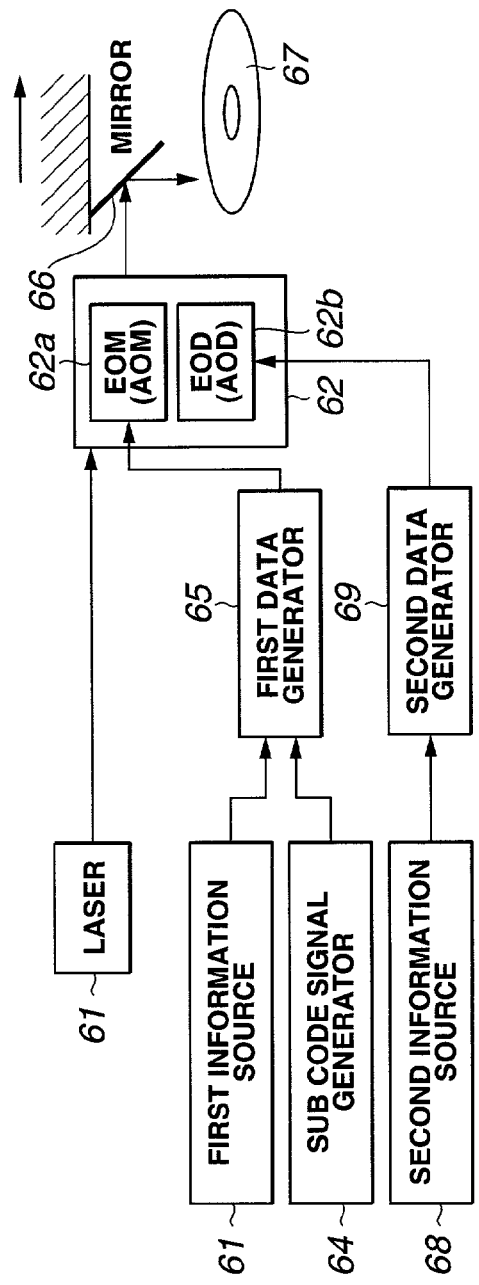
FIG. 8 illustrates the schematic structure of a cutting device for manufacturing an original disc used for manufacturing the disc-shaped recording medium according to the present invention.

In FIG. 7, a photoresist is applied onto an original glass disc at a resist application step 51, and at the subsequent cutting step 52, a pit pattern made up of recesses and protrusions corresponding to the data to be recorded is cut, thus preparing an original disc. This cutting is carried out by using a cutting device for laser cutting as shown in FIG. 8, which will be described later.

At a development and fusing step 53, development and fusing processes are performed on the original disc on which the pit pattern is cut by laser cutting, and at an original metal disc preparation step 54, electroplating is performed on the surface of the disc, thus preparing an original metal disc as a mother disc. Then, at a stamper forming step 55, a stamper based on the original metal disc is produced, and at a substrate forming step 56 using the stamper, a disc substrate made of a transparent resin such as polycarbonate (PC) or acrylic is produced. The pit pattern formed on the original disc at the cutting step is transferred to the disc substrate thus manufactured. At the subsequent reflection film forming step 57, a reflection film is formed by sputtering on the side of the disc substrate where the pit pattern is formed, a reflection film is formed.

After the final manufacturing step of the recording medium or at a step around the final step, the identification information or individual ID data is recorded onto the disc-shaped recording medium 1 according to the present invention. The identification information or individual ID data is recorded by using the reflection film formed on the disc-shaped recording medium 1.

The reflection film used for the disc-shaped recording medium according to the present invention is made of a material which enables recording of data in order to enable recording of the identification information or individual ID data at a later step. Also, the reflection film must be made of a material which enables optical reading of the identification information or individual ID data recorded thereon.

Thus, the reflection film used for the disc-shaped recording medium according to the present invention is made of a material which has approximately the same reflectance as a reflection film of a CD or DVD, or a reflectance enabling reading by a conventional optical head, and such that the reflectance of a light beam like a laser beam for reading is changed by electrothermal recording with a laser beam. Specifically, the reflection film is made of a metal film such that the reflectance for a light beam for reading is changed within a range of approximately 0.5% to 10% by electrothermal recording. More specifically, the reflection film is made of an Al alloy film of $Al_{100-x}X_x$, which is a metal film containing Al as a principal component, or an Ag alloy film of $Ag_{100-x}X_x$, which is a metal film containing Ag as a principal component.

On the reflection film, which is formed on the disc substrate and on which the identification information or individual ID data is recorded, an ultraviolet-setting resin is applied by spin coat and ultraviolet rays are cast thereto, thus forming a protection film, at a protection film application step 58.

The recording of the identification information or individual ID data may be carried out at an information recording step which is carried out after the formation of the reflection film on the disc substrate. The recording of the identification information or individual ID is carried out by electrothermal recording in which a laser beam is cast onto the reflection film to modulate the reflectance.

An example of the cutting device used at the cutting step 52 in the above-described manufacturing process, shown in FIG. 7, for the disc-shaped recording medium, will now be described with reference to FIG. 8.

In the cutting device used in this example, a He—Ne gas laser, an Ar gas laser or the like is used as a laser light source 61 used for cutting a pit pattern corresponding to data to be recorded, as shown in FIG. 8.

A laser beam emitted from the laser light source 61 is supplied to a light modulator 62 and the laser beam is modulated by the light modulator 62 in accordance with the data to be recorded. The laser beam modulated by the light modulator 62 is reflected by a reflection mirror 66 and cast onto an original glass disc 67 coated with a resist. The reflection mirror 66 is movably displaced by a moving mechanism, not shown, so that the laser beam from the light modulator 62 scans the inner and outer circles of the original glass disc 67.

The light modulator 62 used in this case has an EOM (electro-optic modulator) 62*a* with its reflectance changed by an applied voltage based on the recording data, and an EOD (electro-optic deflector) 62*b* with its deflection changed by the applied voltage based on the recording data. In place of these EOM and EOD, an AOM (acousto-optic modulator) and an AOD (acousto-optic deflector) of a type such that coarse to fine waves of ultrasonic waves are generated in the medium by a piezoelectric element may be used.

Information such as a music tune, which is a content constituting the first digital data to be recorded, for example, on the basis of the CD format, onto the disc-shaped recording medium 1 of the present invention, is inputted from a first information supply source 63 as the source of this information to a first data generator 65. The first data generator 65 is supplied with a signal from a sub code signal generator 64 as well as the information from the first information supply source 63. The information and sub code inputted to the first data generator 65 is outputted as data converted to the CD format by the first data generator 65 and is supplied to the EOM 62*a* of the light modulator 62. The EOM 62*a* is used for forming a pit pattern based on the CD recording format.

Information constituting the second digital data to be recorded onto the disc-shaped recording medium 1 on the basis of a different recording format from that of the first digital data, like information added to the first digital data or information constituting work data or the like separate from the first digital data, is inputted from a second information supply source 68 to a second data generator 69. The information inputted to the second data generator 69 is outputted by the second data generator 69 as data of a different recording format from that of the first digital data and is supplied to the EOD 62*b* of the light modulator 62. The EOD 62*b* is used for recording the second digital data, for example, by displacing recording pits constituting the pit pattern based on the first digital data into the direction of track width orthogonal to the extending direction of the recording track.

The disc-shaped recording medium according to the present invention on which the second digital data corresponding to the second work data is recorded in addition to the first digital data corresponding to the first work data and on which the identification information or individual ID data for carrying out identification proper to the recording medium is recorded, as described above, can be used for various purposes by using the individual ID data and the URL (universal resource locater) included in the second digital data as the address of a distribution source for the work data or of a writer such as a performer via a communication network like the Internet.

Figure 9:
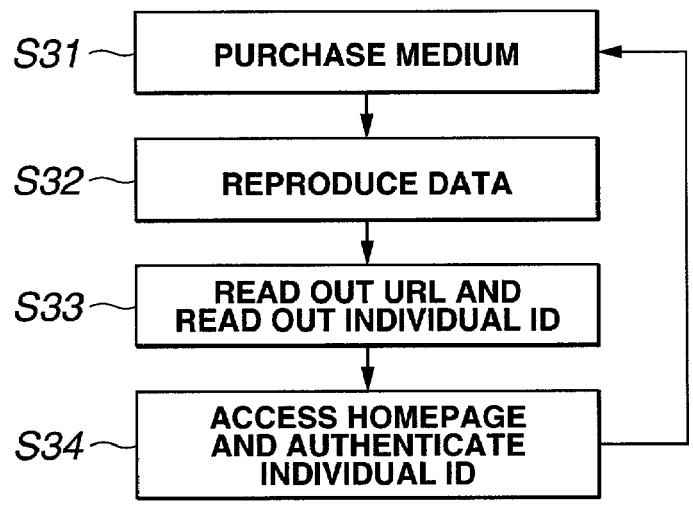
FIG. 9 is a flowchart for explaining an example of the usage of the disc-shaped recording medium according to the present invention.

The method for using the disc-shaped recording medium according to the present invention will now be described with reference to FIG. 9.

First, at step S31, a user purchases the above-described disc-shaped recording medium 1 according to the present invention from a distribution source such as a record company. At step S32, an information processing device such as a personal computer having a communication function which enables connection to a communication network such as the Internet is used as a reproducing device, thus reading out the data recorded on the disc-shaped recording medium 1. At step S33, the URL included in the second digital data and the individual ID data are read out.

At step S34, on the basis of the URL read out from the loaded disc-shaped recording medium 1, the homepage of the distribution source such as the record company supplying the work data or of the writer such as the performer is accessed via the communication network, and the individual ID data read out from the disc-shaped recording medium 1 is authenticated. On the basis of the authentication of the individual ID data, it becomes possible to receive the provision of various services from the record company or the performer. Specifically, the disc-shaped recording medium 1 according to the present invention is linked to the homepage of the medium distribution source such as the record company or of the writer such as the performer. The homepage manager or homepage management program authenticates the validity of the individual ID data distributed from the reproducing device for reproducing the disc-shaped recording medium 1 and the number of times of access, and provides various services. Such various services include no-charge viewing of an Internet live program of the performer, distribution of discount tickets of a concert, sending of image information related to the work data recorded on the disc-shaped recording medium 1, and so on. It is also possible to carry out various types of lot on the basis of the individual ID data. This can also be carried out at a store selling the recording medium 1 or a concert hall, other than via the communication network such as the Internet.

Figure 10:
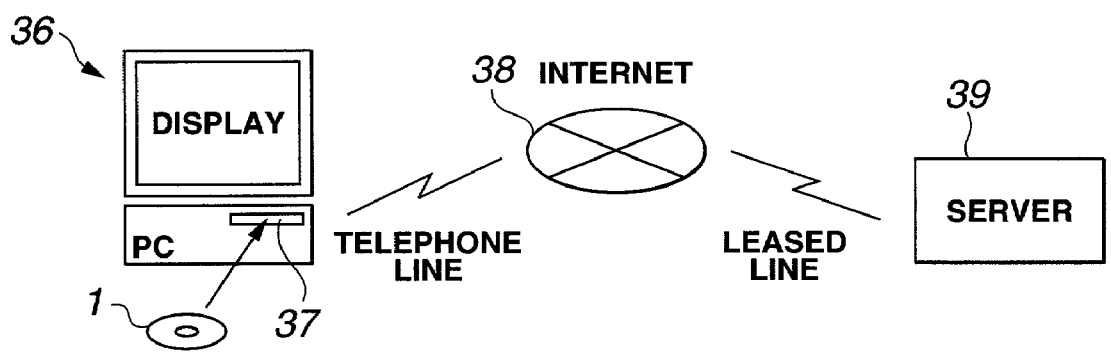
FIG. 10 illustrates an exemplary system for using the disc-shaped recording medium according to the present invention.

The state of reading out the various data and information recorded on the disc-shaped recording medium 1 according to the present invention by a personal computer 36 with a communication function and then carrying out communication with a server 39 owned or managed by the record company as the distribution source of the recording medium 1, in a system as shown in FIG. 10, will now be described with reference to FIG. 11.

Figure 11:
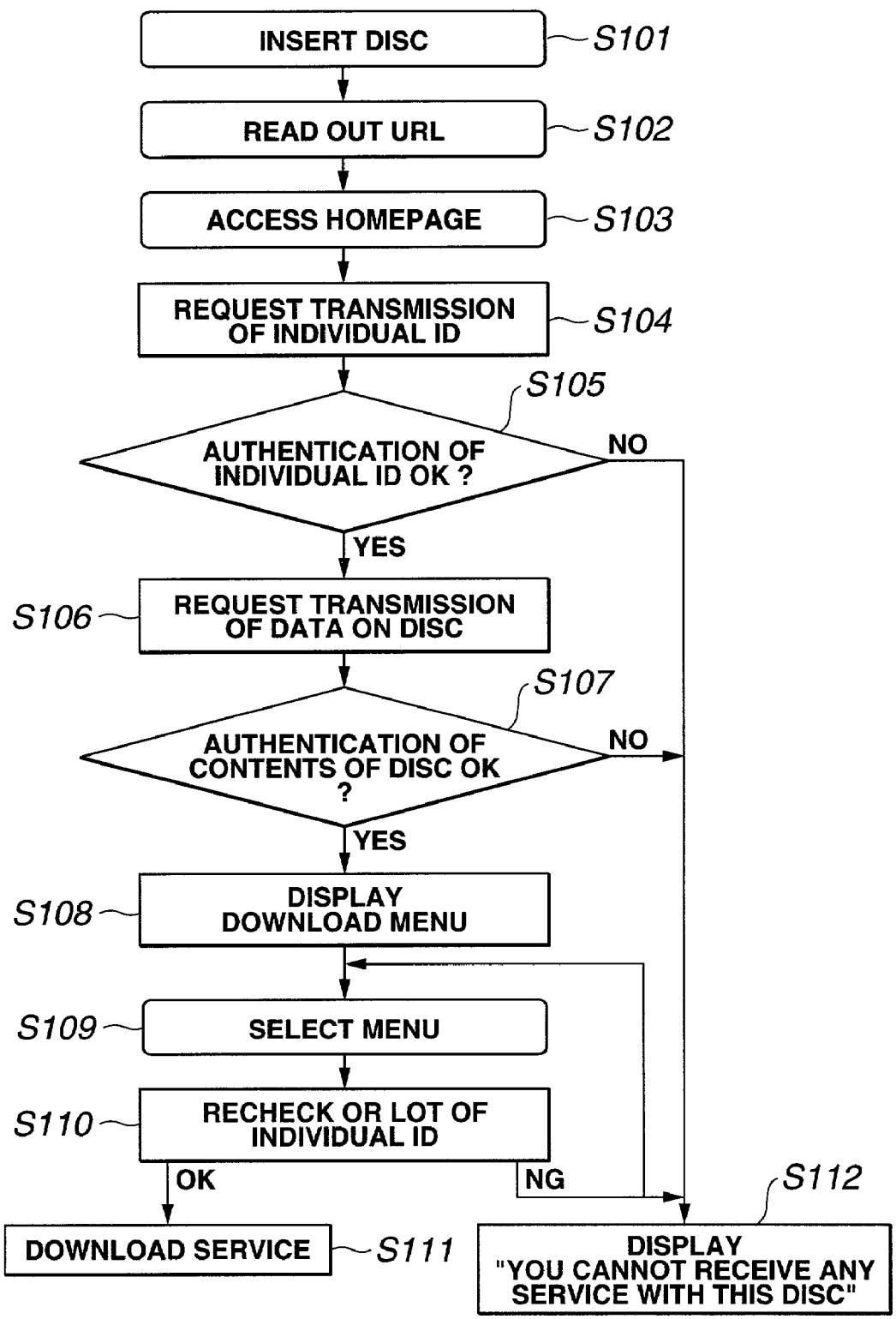
FIG. 11 is a flowchart for explaining the procedure for carrying out communication of data recorded on the disc-shaped recording medium according to the present invention.

In the flowchart of FIG. 11, rectangular blocks with round corners represent processing on the side of the user who purchased the disc-shaped recording medium 1, and rectangular blocks with right-angled corners represent processing of the side of the server such as the record company.

In FIG. 11, at step S101, the user loads the disc-shaped recording medium 1 of the present invention to the personal computer 36 used as the reproducing device. At step S102, the user reads out data related to the URL, which is the network address of the homepage of the server, recorded as the second digital data on the disc-shaped recording medium 1. At step S103, the user accesses the homepage corresponding to the URL thus read out. At step S104, the server 39 requests transmission of the individual ID data. At step S105, the server 39 carries out authentication of the individual ID data recorded as the second digital data on the disc-shaped recording medium 1 and discriminates whether the individual ID data is normally authenticated or not. This authentication of the individual ID data is carried out, for example, in accordance with the procedure shown in FIG. 5. When the authentication of the individual ID data is OK, the server 39 at the next step S106 requests the user to transmit the data on the recording medium 1 and at the next step S107 discriminates whether authentication of the contents of the medium is OK or not. In accordance with these steps S106 and S107, authentication is not normally carried out if the user does not have the disc-shaped recording medium itself even though only the information of individual ID data and URL is obtained from another source. Therefore, whether the user has the recording medium or not can be discriminated.

As the data on the medium that is requested to be transmitted at step S106, for example, data for authentication recorded in advance at a predetermined position of the second digital data recorded on the disc-shaped recording medium, or data recorded at an arbitrary position on the disc-shaped recording medium 1 designated by the server is used.

When it is determined at step S105 or S107 that authentication of the individual ID data or authentication of the contents of the medium is not normally carried out as a result of transmission failure of a part of the second digital data from the user's personal computer, for example, data indicating a notice like "you cannot receive any service with this disc" is transmitted to the personal computer 36 on the user side and is displayed as a warning on a display connected to the personal computer 36 so as to notify the user, at step S112.

When it is determined at step S107 that authentication of the contents of the medium is normally carried out, the processing goes to step S108 and a download menu of the service is transmitted from the server 39 to the personal computer 36 on the user side and displayed on the display of the personal computer 36 on the user side. Items of the download menu include data related to the first digital data on the disc-shaped recording medium 1, for example, poster, jacket, lyrics, liner notes, interview article, new song guide, concert ticket lot, Internet live viewing, sing-along music (karaoke), graffiti and the like. At step S109, the user selects a menu. At the next step S110, the server carries out recheck or lot of the individual ID data. When the result of recheck or lot of the individual ID data is OK, the server provides a download service at step S1. When there is a certain trouble in the result of recheck or lot of the individual ID data (NG), the server causes the display of the user's personal computer 36 to display the above-described notice of step S112, if necessary, and shifts to the state of waiting for the menu selection of step S109.

Figure 12:
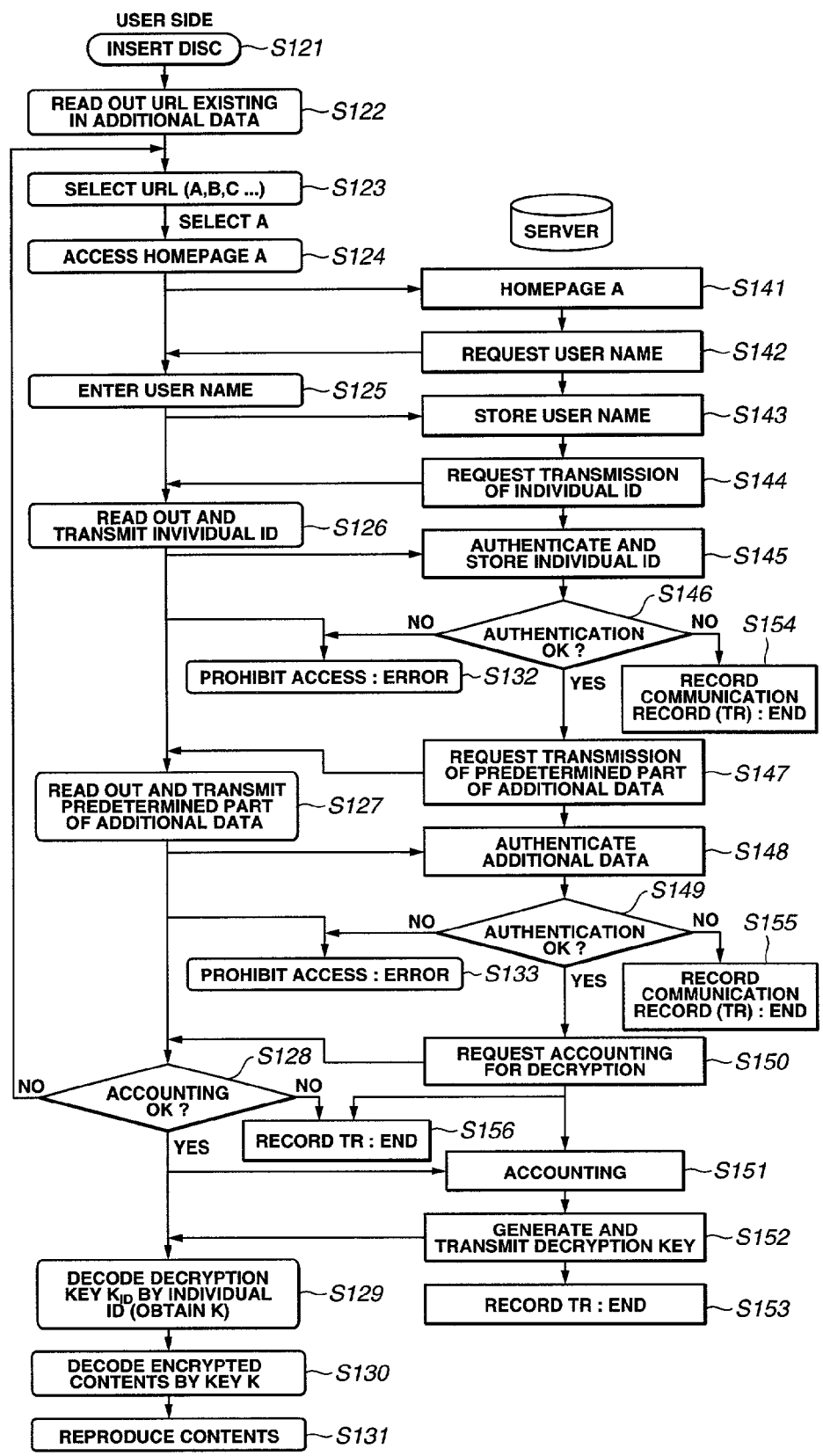
FIG. 12 is a flowchart for explaining another example of the procedure for carrying out communication of data recorded on the disc-shaped recording medium according to the present invention.

FIG. 12 shows the procedure of FIG. 11 further in detail, and particularly shows a specific example in which a key for decryption is obtained from the server 39 whose the homepage is indicated by the URL, in the case where data equivalent to encrypted contents is included in the second digital data recorded on the disc-shaped recording medium 1 manufactured in accordance with the present invention, or in the case where data equivalent to encrypted contents is included in the first digital data equivalent to the main work data recorded on a CD-ROM or the like.

In FIG. 12, at step S121, the user loads the disc-shaped recording medium 1 according to the present invention to the personal computer 36 used as the reproducing device. At step S122, the user reads out data related to the URL, which is the network address of the homepage of the server, recorded as the second digital data in the different recording format from that of the first digital data recorded on the disc-shaped recording medium 1.

In the example shown in FIG. 12, it is assumed that there are a plurality of homepages that can be accessed. At step S123, URLs corresponding to the plurality of homepages A, B, C, . . . are selected. When the homepage A is selected, access to the homepage A is tried at step S124 and the homepage A is accessed at step S141 on the server 39 side. On the server 39 side, at the next step S142, the user name is requested. In response to this, on the user side, the user name is entered at step S125.

The entered user name is sent to the server 39 side. At step S143, the user name is stored (registered) to the server, and at the next step S144, a request for transmission of the individual ID data recorded on the disc-shaped recording medium 1 is outputted. On the user side, at step S126, the individual ID data is read out from the disc-shaped recording medium 1 and transmitted to the server 39. On the server 39 side, at step S145, the individual ID data transmitted from the user side is authenticated and stored, and at step S146, it is discriminated whether authentication is OK or not. When the result of authentication is NO, the server 39 at step S132 prohibits the user from accessing the home page A and causes the display of the user's personal computer 36 to display an error. At the same time, on the server side, at step S154, the communication record TR (transaction) is recorded and communication is ended.

When it is determined at step S146 that authentication of the individual ID data is done, the server at step S147 requests transmission of a predetermined part of the second digital data. In response to this transmission request, the user's personal computer 36 at step S127 reads out and transmits the designated part of the second digital data on the disc-shaped recording medium 1 to the server 39 side. The server 39 at step S148 carries out authentication of the part of the second digital data transmitted thereto. At step S149, the server 39 discriminates whether authentication of the second digital data transmitted thereto is OK or not.

These steps S147 to S149 are equivalent to the request for transmission of data on the medium and the authentication of steps S106 and S107 shown in FIG. 11. In the case where the result of discrimination is NO at step S149 because the second digital data transmitted from the user's personal computer 36 is different from the data managed on the server 39 side or because no response is sent back from the personal computer 36, the server 39 at step S133 prohibits the user from accessing the homepage A and causes the display of the user's personal computer 36 to display an error. At the same time, on the server 39 side, at step S155, the communication record TR (transaction) is recorded and communication is ended. When it is determined at step S149 that authentication is OK, the server 39 proceeds to step S150, for example, to request accounting for decryption. In this case, the user at step S128 selects whether to approve accounting or not. If the user disapproved accounting at step S128, the server 39 of the homepage A is notified of the disapproval of accounting. The server 39 side at step S156 records the communication record TR and ends communication. At the same time, the user side returns to step S123 to shift to the URL selection state for accessing a homepage. If the user approved accounting at step S128, the server 39 side carries out accounting at step S151, and then generates and transmits decryption key data $K_{ID}$ to the user's personal computer 36 at step S152. After that, at step S153, the server 39 side records the communication record TR and ends communication.

It is preferred that the decryption key data $K_{ID}$ is obtained by encoding or encrypting key data K for decoding the digital data equivalent to the encrypted work data, using the serial number or the like of the disc-shaped recording medium 1 included in the individual ID data, so that the decryption key data $K_{ID}$, when stolen, cannot be used without the individual ID data.

Next, at step S129, the user's personal computer 36 decodes or decrypts the decryption key data $K_{ID}$ by using the individual ID data, thus obtaining the key data K for data decoding. At the next step S130, the personal computer 36 decodes or decrypts the data equivalent to the encrypted work data by using the key data K, and the personal computer 36 reproduces the digital data at step S131.

Figure 13:
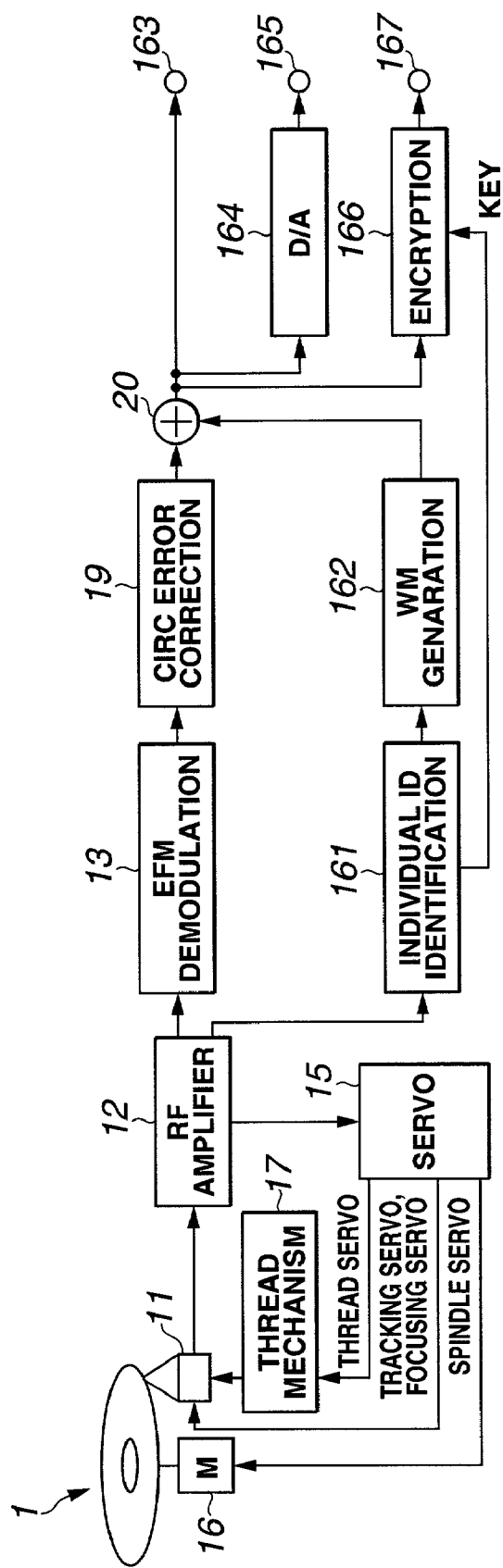
FIG. 13 is a block diagram showing another example of the reproducing device used for reproducing the disc-shaped recording medium according to the present invention.

A reproducing device for explaining a method for duplication/duplication control or duplication/duplication management using the individual ID data recorded on the disc-shaped recording medium 1 will now be described with reference to FIG. 13. In FIG. 13, the same parts as in the structure shown in FIG. 3 are denoted by the same numerals and will not be described further in detail.

In the case of a conventional disc-shaped recording medium as a widely distributed package medium on which individual ID data for carrying out identification proper to the recording medium as in the disc-shaped recording medium 1 according to the present invention is not recorded, when work data recorded on the recording medium is duplicated, which disc-shaped recording medium is used as an original for duplication is not known. Therefore, it is difficult to regulate illegal duplication and illegal distribution of work data.

On the disc-shaped recording medium 1 according to the present invention, individual ID data is recorded by using a watermark. This watermark is recorded by so-called data hiding to embed the watermark so that there is no trouble in the case of reproducing and viewing the work data, for example, by spread spectrum. Thus, the watermark (WM) is embedded in data not only in the case of outputting a digital signal but also in the case of outputting an analog signal converted from digital data, and even if duplication is repeated, the watermark (WM) is handed over into the duplicated data. Therefore, it is possible to find the source and record of the data.

Specifically, in FIG. 13, the work data obtained from an EFM demodulation circuit 13 via a CIRC (cross interleave Reed-Solomon code) error correction circuit 19 is sent to an adder 20. The individual ID data obtained from an RF amplifier 12 is identified and taken out by an individual ID identification circuit 161 and is sent to a watermark (WM) generation circuit 162. The individual ID data is converted watermark (WM) data by the generation circuit 162 using a method of spread spectrum or the like. The individual ID data as the watermark (WM) data is sent to the adder 20, and the individual ID data as the watermark (WM) data is superimposed and added to the work data itself by the adder 20. The work data having the watermark (WM) data superimposed thereon, outputted from the adder 20, is taken out as a digital output from an output terminal 163, or is converted to an analog signal by a D/A (digital/analog) converter 164 and then taken out as an analog output from an output terminal 165.

The work data having the watermark (WM) data superimposed thereon, outputted from the adder 20 constituting the device shown in FIG. 13, may be sent to an encryption circuit 166, then encrypted by the encryption circuit 166 using at least a part of information of the individual ID data from the individual ID identification circuit 161 as an encryption key, and taken out from an output terminal 167. Thus, the encrypted data output becomes an encrypted output proper to the individual ID data and having extremely high safety.

Meanwhile, in the above-described example, the second digital data recorded on the disc-shaped recording medium according to the present invention includes information indicating an address for connection to a network, like URL for access to a homepage on a communication network. However, the second digital data may also include, for example, information for connection to a portable telephone. Also, there may be constructed a data service system in which connection to a network or a portable telephone is made by using the second digital data and in which the depth of connection and the level of available services are controlled in accordance with the individual ID data.

As described above, the lot may be carried out using the individual ID data as a lot number. Moreover, when supplying disc-shaped recording media on the market, it is possible to enable discrimination between the individual ID data of a rental disc and the individual ID data of a disc for sale and to prevent reception of a part of services of the disc for sale with the individual ID data of the rental disc. Furthermore, the disc-shaped recording medium according to the present invention may have a multilayer disc structure having a plurality of recording layers for recording data thereon, in which the first digital data based on the CD format is recorded on the first layer while the second digital data is recorded on the second layer by lowering the reflectance of a light beam for data reading emitted from an optical head so as to prevent the second digital data from being read by an existing disc reproducing device.

Meanwhile, since the identification information or individual ID data enabling identification proper to the recording medium is recorded on the disc-shaped recording medium according to the present invention, the disc-shaped recording medium can be used for various purposes. Thus, it is possible to construct a data processing system which enables provision of various services to a user who properly purchases and uses the disc-shaped recording medium from a proper distribution source.

Figure 14:
FIG. 14 illustrates another example of the recording format of individual ID, which is identification information for carrying out identification proper to the disc-shaped recording medium, recorded on the disc-shaped recording medium according to the present invention.

On the disc-shaped recording medium used here according to the present invention, a work identification code for identifying individual work data recorded in the data recording area is recorded in the individual ID data, as shown in FIG. 14. The work identification code is recorded in accordance with ISRC. The individual ID data including ISRC is encrypted in accordance with a common key system like the RSA public key system or the DES system, as described above.

The disc-shaped recording medium used here allows free duplication of data recorded thereon. In the case of duplicating the data, the individual ID data is duplicated in the encrypted state. By obtaining a key for decryption from the distribution source such as a record company, reproduction of the work data is made possible.

Figure 15:
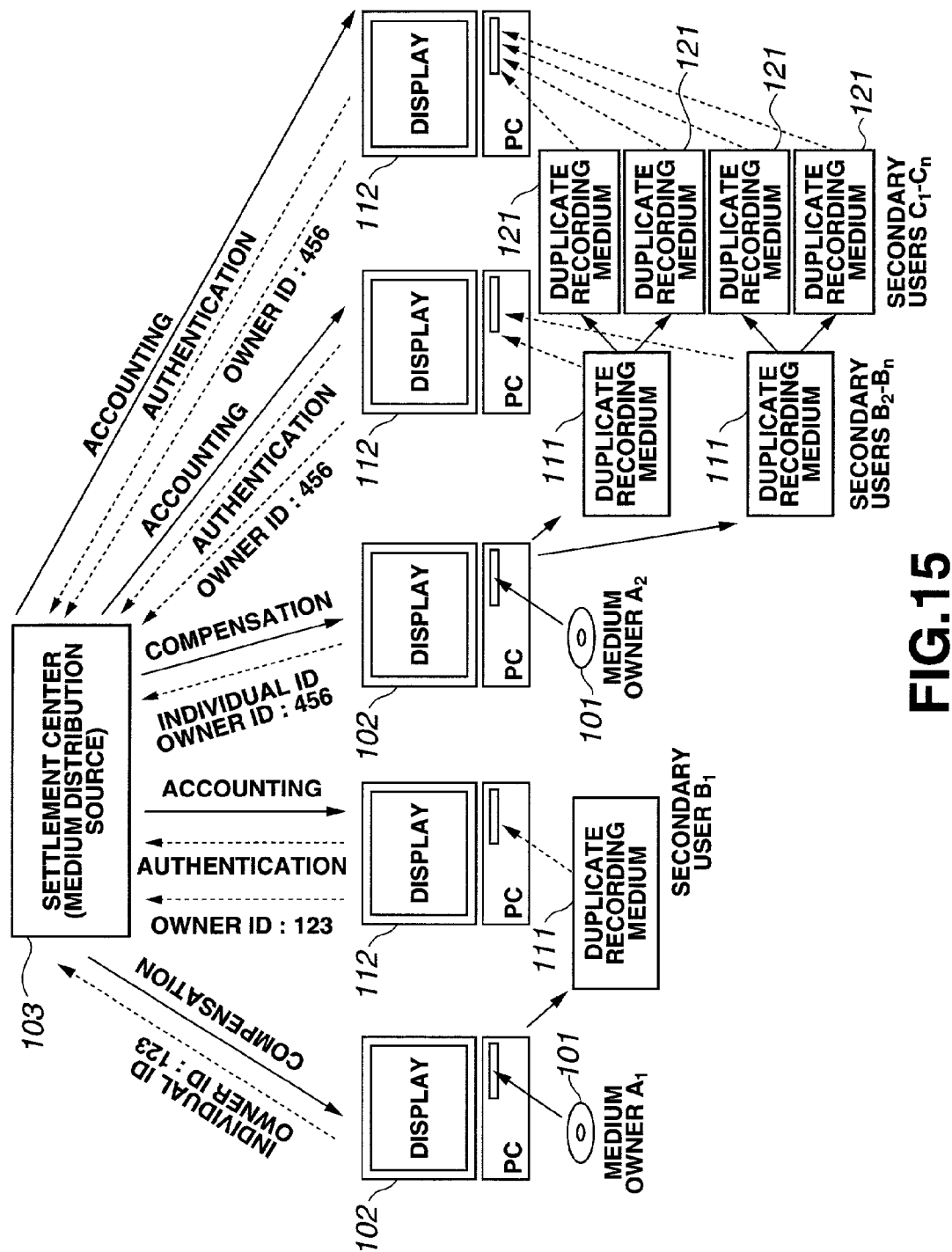
FIG. 15 shows a data processing system for carrying out processing of data recorded on the disc-shaped recording medium according to the present invention.

A medium owner A1 who properly obtained a disc-shaped recording medium 101 constituted as a package medium according to the present invention by purchasing from a distribution source such as a record company reads out at least individual ID data recorded on the disc-shaped recording medium 101 by using a reproducing device of an information processing device 102 such as a personal computer with a communication function to enable connection to a communication network like the Internet, and transmits the read-out individual ID data together with owner identification ID data such as URL specifying the medium owner A1 to a settlement center 103 of the record company of the distribution source, which functions as a data processing organization, as shown in FIG. 15. The settlement center 103 registers the individual ID data and the owner identification ID data transmitted from the medium owner A1 and specifies the medium owner A1 of the disc-shaped recording medium 101. The URL of the settlement center 103 is recorded on the disc-shaped recording medium 101 in order to enable access to the settlement center 103.

On the other hand, the medium owner A1 can produce a duplicate recording medium 111 to which the data recorded on the disc-shaped recording medium 101 is duplicated by using the information processing device 102, in order for a secondary user B1 to use the duplicate recording medium 111. On the duplicate recording medium 111, the individual ID data as well as the work data recorded on the original disc-shaped recording medium 101 is duplicated. In this case, the individual ID data is duplicated as it remains in the encrypted state.

The secondary user B1 who obtained the duplicate recording medium 111 reads out data related to the URL of the settlement center 103 recorded on the duplicate recording medium 111 by using a reproducing device of an information processing device 112 such as a personal computer with a communication function, then accesses the settlement center 103 on the basis of the read-out data related to the URL, and is subject to authentication of the individual ID data read out from the duplicate recording medium 111. In this case, the settlement center 103 carries out accounting for the secondary user B1. When accounting is correctly carried out, the settlement center 103 provides data related to a key for decrypting the encrypted individual ID data to the secondary user B1 and decodes the data related to the key obtained similarly to the above-described step S129 by using the individual ID data, thus enabling reproduction of the work data recorded on the duplicate recording medium 111.

Similarly, another medium owner A2 who properly obtained a disc-shaped recording medium 101 from a distribution source such as a record company can produce a duplicate recording medium 111 and let other secondary users B2, B3 use the duplicate recording medium 111, as shown in FIG. 15. In this case, too, the secondary users B2, B3 are subject to authentication of the individual ID data of the duplicate recording medium 111 and accounting at the settlement center 103 and obtain data related to a key, thus enabling reproduction of the work data recorded on the duplicate recording medium 111.

Moreover, another medium owner A3 who properly obtained a disc-shaped recording medium 101 from a distribution source such as a record company can produce a duplicate recording medium 111 and let other secondary users B4, B5, . . . , Bn use the duplicate recording medium 111. In this case, too, the secondary users B4, B5, . . . , Bn are subject to authentication of the individual ID data of the duplicate recording medium 111 and accounting at the settlement center 103 and obtain data related to a key, thus enabling reproduction of the work data recorded on the duplicate recording medium 111.

It is also possible to produce a duplicate recording medium 121 to which the data on the duplicate recording medium 111 duplicated from the disc-shaped recording medium 101 distributed from the distribution source is duplicated, and let other secondary users C1, C2, . . . , Cn use the duplicate recording medium 121, as shown in FIG. 15. On the duplicate recording medium 121, too, the individual data recorded on te disc-shaped recording medium 101 distributed from the distribution source is duplicated. Similarly, it is also possible to produce a duplicate recording medium on which the data on the duplicate recording medium 121 is duplicated, and let other secondary users use it.

The settlement center 103 totals the individual ID data of the disc-shaped recording medium 101 distributed from the distribution source which are transmitted from the secondary users B1–Bn and C1–Cn using the respective duplicate recording media 111, 121, and thus totals the quantity of duplication of each disc-shaped recording medium 101.

In accordance with the quantity of the individual ID data which are transmitted from the secondary users B1–Bn and C1–Cn using the duplicate recording media 111, 121 and are totaled for each disc-shaped recording medium 101, the settlement center 103 calculates the distribution rate for distributing a part of the fee collected from the secondary users B1–Bn and C1–Cn to the medium owners A1–An and thus carries out distribution of the fee.

As a method for distributing a part of the fee, for example, 5% of the total amount of fee, as a total amount of distributed fee T to the medium owners A1–An, distribution is carried out in accordance with the quantity of the individual ID data totaled for each disc-shaped recording medium.

For example, distribution is carried out in accordance with the total quantity of each individual ID data. It is now assumed that there are five medium owners having the disc-shaped recording medium 101 distributed from the distribution source, and that the total quantity ID1 of the individual ID data of the recording medium owned by the first medium owner A1 is 14%, the total quantity ID2 of the individual ID data of the recording medium owned by the second medium owner A2 is 40%, the total quantity ID3 of the individual ID data of the recording medium owned by the third medium owner A3 is 5%, the total quantity ID4 of the individual ID data of the recording medium owned by the fourth medium owner A4 is 5%, the total quantity ID5 of the individual ID data of the recording medium owned by the fifth medium owner A5 is 1%, and the quantity of the individual data of the recording medium owned by an unknown owner is 10%. Then, the amounts of distributed fee received by the medium owners A1–A5 in accordance with the proportion of totaling are as follows.

The first medium owner A1 receives the distributed fee at a rate of 0.14 T. The second medium owner A2 receives the distributed fee at a rate of 0.4 T. The third medium owner A3 receives the distributed fee at a rate of 0.05 T. The fourth medium owner A4 receives the distributed fee at a rate of 0.05 T. The fifth medium owner A5 receives the distributed fee at a rate of 0.01 T.

If the distributed fee with respect to 10% for the unknown owner is to be distributed, the first medium owner A1 receives the distributed fee at a rate of $^{14}/_{90}$ T and the second medium owner A2 receives the distributed fee at a rate of $^{40}/_{90}$ T. Similarly, the other medium owners A3–A5 also receive the distributed fee.

In the case where the first to fifth medium owners receive an equal amount of distributed fee irrespective of the total quantity of the individual ID data, each owner receives the distributed fee at a rate of 0.18 T. If the distributed fee with respect to 10% for the unknown owner is to be distributed in this case, each owner receives at a rate of 0.2 T.

The distribution of a part of the fee is a reward for contribution to further distribution of the work data and the fee is distributed in accordance with the quantity of duplication. This distribution of the fee is carried out, for example, in accordance with the quantity of duplication from the disc-shaped recording medium 101 owned by the medium owners A1–An on the basis of the total quantity of duplicate recording media. The distribution may also be gradient distribution in consideration of the degree of contribution to distribution of the work data. For example, distribution rates are provided in accordance with the order of obtaining the disc-shaped recording medium 101, and gradient distribution is carried out in the order from the first owner who produces the duplicate recording medium and registers the owner identification ID data.

In the above-described example, the distributed fee is provided only to the medium owners having a total quantity of 10% or more, in consideration of the degree of contribution to the quantity of duplication, that is, the degree of contribution to distribution of a music tune. In this case, the distribution of the fee is carried out as follows in consideration of the degree of contribution to distribution of a music tune as work data.

That is, the distribution rate for the first medium owner A1 is $\{(14/(14+40+30)\}T=\frac{1}{6}$ T. The distribution rate for the second medium owner A2 is $^{10}/_{21}$ T. The distribution rate for the third medium owner A3 is 0. The distribution rate for the fourth medium owner A4 is $\frac{5}{14}$ T. The distribution rate for the fifth medium owner A5 is 0.

In the case where an equal amount is to be distributed to the medium owners having a total quantity of 10% or more, the first, second and fourth medium owners receive distribution of the fee, that is, $\frac{1}{3}$ T each.

Moreover, a medium owner having a large total quantity of individual ID data raises the obtained distribution rate to $\frac{3}{2}$-th power, in consideration of the large degree of contribution to distribution of the music tune.

Furthermore, the distribution rates are caused to be step functions in accordance with the rate of total quantity. The distribution rate is sequentially increased, for example, 0.01 in the case where the rate of total quantity of the individual ID data is 1–10%, 0.02 in the case where the rate of total quantity is 20–30%, and 0.90 in the case where the rate of total quantity is 90–100%.

The distribution of a part of the fee may also be carried out for the secondary users B1–Bn who produced still another duplicate recording medium 121 from the duplicate recording medium 111. This is because the secondary users B1–Bn, too, contributed to distribution of the work data.

In the case of producing the duplicate recording medium 111 from the disc-shaped recording medium 101, some of a plurality of work data recorded on the disc-shaped recording medium 101 may be selectively duplicated by using the ISRC recorded as a part of the individual ID data.

The medium owner who properly obtained the disc-shaped recording medium according to the present invention can prepare a data site having contents of appropriate music tunes selected and combined from the obtained disc-shaped recording medium and carry out distribution of the contents from this site to a user who requests duplication.

Figure 16:
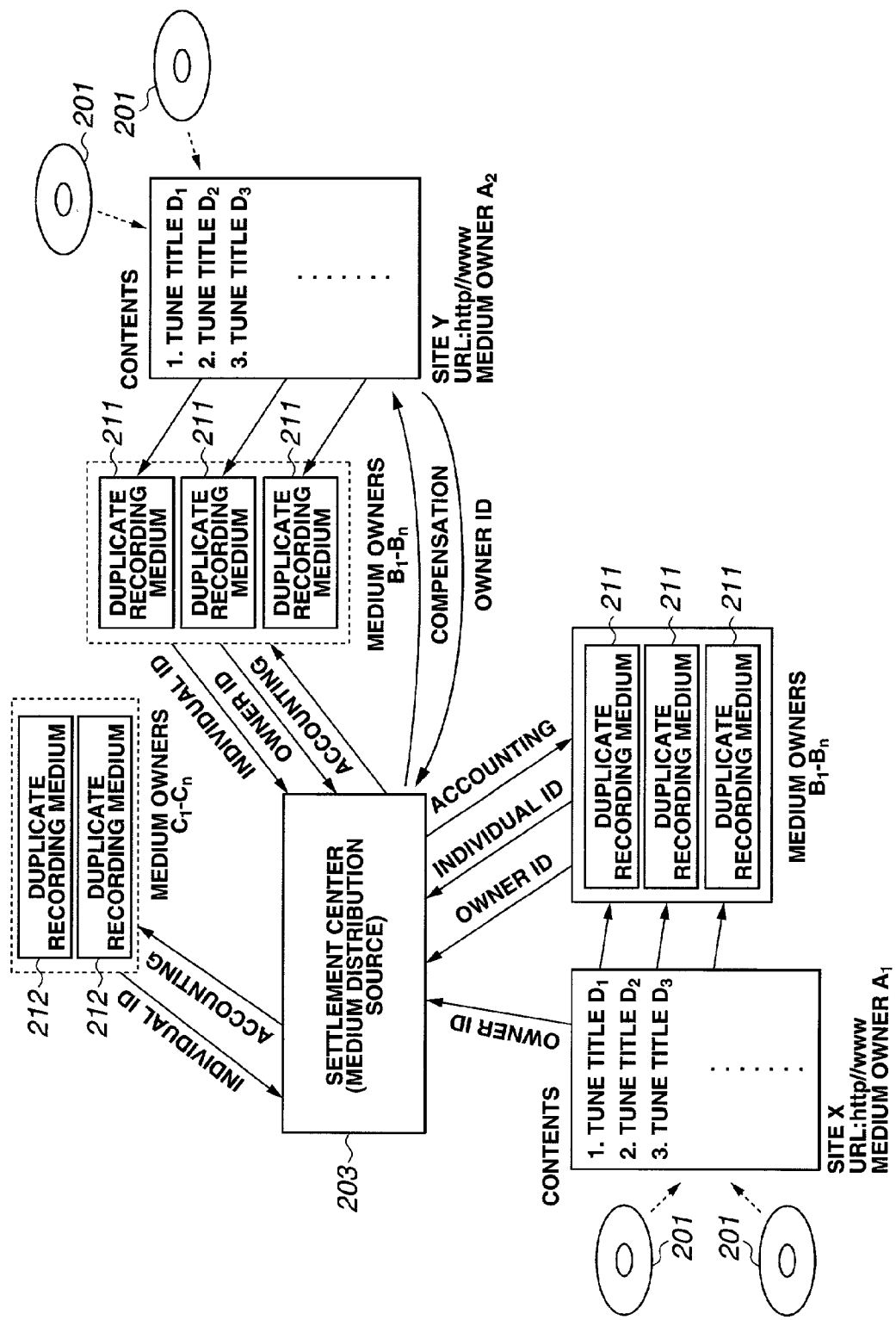
FIG. 16 shows another example of the processing system for carrying out processing of data recorded on the disc-shaped recording medium according to the present invention.

A medium owner A1 who properly obtained a disc-shaped recording medium 201 according to the present invention duplicates work data D1, D2, . . . , Dn of desired music tunes from the obtained disc-shaped recording medium 201 to a site X which the medium owner A1 manages, as shown in FIG. 16. In this case, the work data D1, D2, . . . , Dn may be duplicated from a plurality of disc-shaped recording media 201. By thus using the plurality of disc-shaped recording media 201 as providing sources of the work data, contents specific to the medium owner A1 are included in the site X.

The site X in this case is, for example, a homepage of an individual user which is laid open to the public so that other users can download the work data from the disc-shaped recording medium 201 via a communication medium such as the Internet by using a personal computer with a communication function.

When duplicating the work data from the disc-shaped recording medium 201, the individual ID data recorded on the disc-shaped recording medium is also duplicated.

When duplicating the data from the disc-shaped recording medium 201, the medium owner A1 transmits owner identification ID data like URL specifying the medium owner A1 together with the individual ID data recorded on the disc-shaped recording medium 201 to a settlement center 203 via a communication medium such as the Internet, and thus carries out owner registration.

With respect to the data format of the data duplicated to the site X, data such as download URL specifying the site X and bookmark URL corresponding to each work data are recorded in addition to the individual ID data including work identification code ISRC for identifying the work data duplicated from the disc-shaped recording medium 201, as shown in FIG. 17.

A person who wants the work data of the contents present at the site X accesses the site X, selects all or some of the desired work data D1, D2, . . . , Dn, then downloads the selected work data to his/her own recording medium by using a personal computer or the like, and thus prepares a duplicate recording medium 211.

One or a plurality of secondary users B1–Bn who prepared the duplicate recording medium 211 on the basis of the contents of the site X read out data related to the URL Of the settlement center 203 which is recorded on the duplicate recording medium 211, then access the settlement center 203 on the basis of the read-out data related to the URL, and are subject to authentication of the individual ID data read out from the duplicate recording medium 211. In this case, the settlement center 203 carries out accounting to the secondary users B1–Bn. When accounting is normally carried out, the settlement center 203 provides data related to a key for decrypting the encrypted work data to the secondary users B1–Bn and enables reproduction of the work data duplicated and recorded on the duplicate recording medium 211, similarly to the above-described step S129. The accounting in this case can be carried out on the basis of the work data as a unit, using ISRC recorded on the duplicate recording medium 211.

Similarly, another medium owner A2 who properly obtained a disc-shaped recording medium 201 from a distribution source such as a record company duplicates work data D1, D2, . . . , Dn of desired music tunes from the obtained disc-shaped recording medium 201 to a site Y which the medium owner A2 manages, as shown in FIG. 16. When duplicating the data from the disc-shaped recording medium 201, the medium owner A2, too, transmits owner identification ID data like URL specifying the medium owner A2 together with the individual ID data recorded on the disc-shaped recording medium 201 to the settlement center 203 via a communication medium such as the Internet, and thus carries out owner registration.

Similarly to the case of accessing the site X to prepare the duplicate recording medium 211 as described above, secondary users B1–Bn who want the work data of the contents present at the site Y accesses the settlement center 203 and are subject to authentication of the individual ID data read out from the duplicate recording medium 211. In this case, the settlement center 203 carries out accounting to the secondary users B1–Bn. When accounting is normally carried out, the settlement center 203 provides data related to a key for decrypting the encrypted work data to the secondary users B1–Bn and enables reproduction of the work data recorded on the duplicate recording medium 211.

It is also possible to duplicate the data recorded on the duplicate recording medium 211 prepared by accessing the site X or Y, thus prepare a duplicate recording medium 212, and let other secondary users C1, C2, . . . , Cn use the duplicate recording medium 212. Also, the secondary users C1–Cn who use the duplicate recording medium 212 access the settlement center 203 and are subject to authentication of the individual ID data read out from the duplicate recording medium 212. Then, accounting is carried out. When accounting is normally carried out, data related to a key for decrypting the encrypted work data is obtained to enable reproduction of the work data recorded on the duplicate recording medium 212.

In this system, too, the settlement center 203 totals the individual ID data of the disc-shaped recording medium 201 distributed from the distribution source, transmitted from the secondary users B1–Bn and C1–Cn who use the respective duplicate recording medium 211, 212, and totals the quantity of duplication of each disc-shaped recording medium 201.

Then, the settlement center 203 distributes a part of the fee collected from the secondary users B1–Bn and C1–Cn to the medium owners A1–An in accordance with the quantity of the individual ID data which are transmitted from the secondary users B1–Bn and C1–Cn using the duplicate recording media 211, 212 and totaled for each disc-shaped recording medium 201. As distribution of a part of the fee in this case, gradient distribution is carried out in consideration of the degree of contribution to distribution of the work data.

The data recorded on the disc-shaped recording medium 201 distributed from the distribution source is duplicated from one duplicate recording medium 211 to another duplicate recording medium 212. Thus, in order to clarify the route of duplication of data, an area for recording the owner identification ID data specifying the duplication source and the data related to the URL of the site X or Y is provided in the data recorded on the duplicate recording media 211, 212, as shown in FIG. 18. Every time the data on the disc-shaped recording medium 201 distributed from the distribution source or the duplicate recording medium 211 or 212 is duplicated, the owner identification ID data and/or the data related to the URL of the site X or Y is recorded. As the owner identification ID data and the data related to the URL of the site X or Y are sequentially recorded, which route is used for duplicating the data is clarified. Also, the first person who duplicated the data from the disc-shaped recording medium 201 and thus contributed to distribution, and the last person who contributed to distribution of the data are clarified. The first person who distributed the data is the first person who paid attention to the distributed work data and therefore contributed largely to distribution of the data. The last person who contributed to distribution of the work data is regarded as a person who raised the degree of attention such as access to the work data.

Thus, in the case of recording the owner identification ID data and/or the data related to the URL of the site X or Y, if the area for recording these data is full, the owner identification ID data and the data related to the URL of the first person who distributed the data are left and the old owner identification ID data and data related to the URL are sequentially deleted while new owner identification ID data and data related to the URL are recorded. By thus recording the owner identification ID data and the data related to the URL of the site X or Y, gradient distribution of the fee in consideration of the degree of contribution to distribution of the work data can be easily carried out.

In this example, when duplicating data from the sites of the medium owners A1–An, the secondary users B1–Bn and C1–Cn may not only carry out duplication to a separately handled recording medium such as a magneto-optical disc, CD-R, CD-RW or a recording medium using a solid state memory, but also construct a new site using an information processing device such as a personal computer, similarly to the medium owners A1–An.

In the case of duplicating the data from the disc-shaped recording medium distributed from the distribution source and thus preparing a duplicate recording medium in the above-described example, the medium owner ID may be simultaneously recorded in a part of the data to be duplicated. By recording the medium owner ID data, it is possible to clarify the source of the duplicate recording medium.

In the above-described examples, a part of the fee is distributed to the distributor of the data as a reward for contribution to distribution of the work data. However, this reward is not limited to a part of the fee and various types of rewards may be used such as concert tickets of the performer of the work data.

In the above description, a disc-shaped recording medium is used as the data recording medium according to the present invention. However, the data recording medium of the present invention can also be applied to a card-type recording medium or a tape-shaped recording medium. The data modulation system is not limited to EFM (8–14 modulation) and various modulation systems such as 8–16 modulation can be used. In addition, various modifications and changes can be effected without departing from the scope of the present invention.

Meanwhile, it is now assumed that, in the case of carrying out gradient distribution of a part of the fee generated by duplication of the work data in consideration of the degree of contribution to distribution of the work data, there are 10 generations of medium owners An, including a first medium owner A1 who first obtained a recording medium from a distribution source, a second medium owner A2 who received distribution of the work data from the first medium owner A1 and thus owns a duplicate recording medium, and a third medium owner A3 who received distribution of the work data from the second medium owner A2 and thus owns a duplicate recording medium. In this case, if it is considered that a medium owner of a later generation who received distribution of the work data and owns a duplicate recording medium has a higher degree of contribution to distribution of the work data, the medium owners receive distribution of a part of the fee as follows.

That is, a part of the fee is distributed at a rate of ½ to the tenth medium owner A10 who owns the owner identification ID of the tenth generation, ¼ to the ninth medium owner A9 who owns the owner identification ID of the ninth generation, . . . , $½^9$ to the second medium owner A2 who owns the owner identification ID of the second generation, and $½^{10}$ to the first medium owner A1 who owns the owner identification ID of the first generation.

Alternatively, if it is considered that a medium owner of an earlier generation has a higher degree of contribution to distribution of the work data, the medium owners receive distribution of a part of the fee as follows.

That is, a part of the fee is distributed at a rate of 1/55 to the tenth medium owner A10 who owns the owner identification ID of the tenth generation, 2/55 to the ninth medium owner A9 who owns the owner identification ID of the ninth generation, . . . , 9/55 to the second medium owner A2 who owns the owner identification ID of the second generation, and 10/55 to the first medium owner A1 who owns the owner identification ID of the first generation.

Alternatively, if it is considered that the medium owners who distributed the work data have an equal degree of contribution among the 10 generations, a part of the fee is distributed equally toe the medium owners of the respective generations.

Moreover, if it is considered that the first medium owner who obtained the recording medium and distributed the work data and the last medium owner who received distribution of the work data and owns a duplicate recording medium have a higher degree of contribution to distribution of the work data, a part of the fee is distributed at a rate of 5/30 to the tenth medium owner A10 who owns the owner identification ID of the tenth generation, 4/30 to the ninth medium owner A9 who owns the owner identification ID of the ninth generation, . . . , 4/30 to the second medium owner A2 who owns the owner identification ID of the second generation, and 5/30 to the first medium owner A1 who owns the owner identification ID of the first generation.

In view of the distribution of a part of the fee among the respective generations in accordance with the degree of contribution to distribution of the work data, in the case of recording the owner identification ID data and/or the data related to the URL of the site X or Y, the data are recorded for 10 generations immediately before or for the first 10 generations. Alternatively, by leaving the data for the first 2 generations and the data for 8 generations immediately before and deleting the data for the other generations, it is possible to constantly record data for predetermined generations.

In the case where the owner identification ID data is repeatedly duplicated and recorded, for example, three times or more, the preceding data or subsequent data is deleted so as to leave data for generations suitable for use. By thus changing the generations, it is possible to realize maintenance of medium owners in consideration of the degree of contribution to distribution of the work data.

INDUSTRIAL APPLICABILITY

According to the present invention, since identification information which enables identification among data recording media of the same type having the same work data recorded thereon is recorded on the data recording medium, management of the data recording medium having the work data recorded thereon can be securely carried out and multiple use of the data recording medium is made possible such as duplication of the work data recorded on one data recording medium for a plurality of times without losing the interest of the copyright holder while carrying out management of the location or the like of the work data recorded on the data recording medium.

Moreover, according to the present invention, it is possible to duplicate work data while protecting the interest of the writer of the work data recorded on the data recording medium, and the interest of an information provider who contributed to distribution of the work data is also protected. Therefore, further popularization of the distributed work data can be realized.

What is claimed is:

1. A data recording medium having recorded thereon:
   digital data including at least work data,
   identification information identifying an individual recording medium, and
   discrimination information indicating the presence/absence of the identification information, wherein the identification information is recorded in an area on an outer side of a lead-out area provided on an outer side of a data recording area where the digital data is recorded.

2. The data recording medium as claimed in claim 1, wherein the discrimination information is recorded in a lead-in area provided on an inner side of a data recording area where the digital data is recorded.

3. The data recording medium as claimed in claim 1, wherein the identification information includes serial number information for carrying out identification from other data recording media.

4. The data recording medium as claimed in claim 1, wherein the identification information includes work provider information indicating a provider of the work data included in the digital data.

5. The data recording medium as claimed in claim 1, wherein the identification information includes work identification information for identifying the recorded digital data.

6. The data recording medium as claimed in claim 1, wherein the identification information includes manufacturing device information indicating a manufacturing device of the recording medium.

7. The data recording medium as claimed in claim 1, wherein the identification information is data-converted information.

8. The data recording medium as claimed in claim 7, wherein the data-converted information is encrypted data.

9. The data recording medium as claimed in claim 1, wherein error correction coding is performed on the identification information.

10. The data recording medium as claimed in claim 1, wherein one of error correction coding and error detection coding of a plurality of code sequences is performed on the identification information, and authentication of the identification information is carried out with at least a code of one sequence.

11. The data recording medium as claimed in claim 1, wherein the digital data is recorded in accordance with a modulation system of one of 8–14 modulation or 8–16 modulation.

12. The data recording medium as claimed in claim 1, wherein the data recording medium is for reproduction only.

13. A data recording medium having recorded thereon in advance:
   first digital data including at least work data;
   second digital data recorded by a different recording method than a recording method used to record the first digital data; and
   identification information for identifying the individual recording medium, wherein the identification information is recorded in an area on an outer side of a lead-out area provided on an outer side of a data recording area where the first and/or second digital data is recorded.

14. The data recording medium as claimed in claim 13, wherein discrimination information indicating whether at least one of the second digital data and the identification information exists is recorded in advance of the work data.

15. The data recording medium as claimed in claim 13, wherein the discrimination information is recorded in a lead-in area provided on an inner side of a data recording area where the first and/or second digital data is recorded.

16. The data recording medium as claimed in claim 13, wherein the identification information includes serial number information.

17. The data recording medium as claimed in claim 13, wherein the identification information includes work provider information indicating a provider of the work data included in the first and/or second digital data.

18. The data recording medium as claimed in claim 13, wherein the identification information includes work identification information for identifying the work data included in the first and/or second digital data.

19. The data recording medium as claimed in claim 13, wherein the identification information includes manufacturing device information indicating a manufacturing device of the recording medium.

20. The data recording medium as claimed in claim 13, wherein the identification information is data-converted information.

21. The data recording medium as claimed in claim 20, wherein the data-converted information is encrypted data.

22. The data recording medium as claimed in claim 13, wherein error correction coding is performed on the identification information.

23. The data recording medium as claimed in claim 13, wherein one of error correction coding and error detection coding of a plurality of code sequences is performed on the identification information, and authentication of the identification information is carried out with at least a code of one sequence.

24. The data recording medium as claimed in claim 13, wherein the first and/or second digital data is recorded in accordance with a modulation system of one of 8–14 modulation and 8–16 modulation.

25. The data recording medium as claimed in claim 13, wherein the data recording medium is for reproduction only.

26. The data recording medium as claimed in claim 13, wherein the first digital data is recorded by pit edge recording and the second digital data is recorded by changing a shape of pits.

27. The data recording medium as claimed in claim 13, wherein the first digital data is recorded by pit edge recording and the second digital data is recorded by changing a position of pits.

28. The data recording medium as claimed in claim 13, wherein the second digital data is at least one of compressed audio data, image data, and text data.

29. A data recording medium having recorded thereon in advance:
   first digital data including at least work data;
   second digital data recorded by a different recording method than a recording method used to record the first digital data; and
   identification information for identifying the individual recording medium, wherein the second digital data includes information for connecting to a communication network.

30. A data recording medium having recorded thereon in advance:
   first digital data including at least work data;
   second digital data recorded by a different recording method than a recording method used to record the first digital data; and
   identification information for identifying the individual recording medium, wherein the second digital data includes information for connecting to a portable telephone.

31. A data reproducing device for reproducing a data recording medium on which digital data including at least work data is recorded, the device comprising:
   discrimination means for discriminating whether second work data recorded by a different recording method than a recording method used to record first work data is recorded on the data recording medium; and
   reading means for reading out identification information identifying an individual recording medium recorded on the data recording medium, when it is discriminated by the discrimination means that the second work data is recorded on the data recording medium.

32. A data processing system comprising:
   a data recording medium having recorded thereon digital data including at least work data and having recorded thereon in advance of the work data identification information identifying an individual recording medium;
   information providing means for providing a duplicate recording medium obtained by duplicating at least the digital data recorded on the data recording medium and then adding information provider identification information to the duplicated digital data;
   reproducing means for reproducing the digital data having the information provider identification information added thereto, recorded on the duplicate recording medium; and
   work data managing means to which the information provider identification information generated by the information providing means and the information provider identification information recorded on the duplicate recording medium and reproduced by the reproducing means are transmitted.

33. The data processing system as claimed in claim 32, wherein the work data managing means carries out accounting to the reproducing means, and collates the information provider identification information transmitted from the information providing means and the information provider identification information transmitted from the reproducing means and then totals the collated information provider identification information.

34. The data processing system as claimed in claim 32, wherein the work data managing means carries out accounting to the reproducing means when at least the information provider identification information recorded on the duplicate recording medium is transmitted from the reproducing means for the duplicate recording medium.

35. The data processing system as claimed in claim 32, wherein the work data managing means provides compensation to the information providing means in accordance with the information provider identification information transmitted from at least the information providing means.

36. The data processing system as claimed in claim 35, wherein the work data managing means provides compensation to the information providing means in accordance with a quantity of coincidence between the information provider identification information transmitted from the information providing means and the information provider identification information transmitted from the reproducing means.

37. The data processing system as claimed in claim 36, wherein the compensation is a part of a fee charged to the reproducing means.

38. The data processing system as claimed in claim 32, wherein discrimination information indicating the presence/absence of the identification information is further recorded on the data recording medium.

39. A data processing system comprising:
  information providing means for providing information obtained by duplicating at least digital recorded on a data recording medium having recorded thereon the digital data including at least work data and having recorded thereon in advance of the work data identification information identifying an individual recording medium and discrimination information indicating a presence/absence of the identification information, and then by adding information provider identification information to the duplicated digital data;
  access means for accessing the information providing means to download at least the digital data duplicated from the data recording medium, having the information provider identification information added thereto and recorded in the information providing means; and
  work data managing means to which the information provider identification information generated by the information providing means and the information provider identification information downloaded by the access means are transmitted.

40. The data processing system as claimed in claim 39, wherein the work data managing means carries out accounting to the reproducing means, and collates the information provider identification information transmitted from the information providing means and the information provider identification information transmitted from the access means and then totals the collated information provider identification information.

41. The data processing system as claimed in claim 40, wherein the work data managing means carries out accounting to the reproducing means when at least the information provider identification information downloaded from the information providing means is transmitted from the access means.

42. The data processing system as claimed in claim 39, wherein the work data managing means provides compensation to the information providing means in accordance with the information provider identification information transmitted from at least the information providing means.

43. The data processing system as claimed in claim 42, wherein the work data managing means provides compensation to the information providing means in accordance with the quantity of collation between the information provider identification information transmitted from the information providing means and the information provider identification information transmitted from the access means.

44. The data processing system as claimed in claim 42, wherein the compensation is a part of a fee charged to the access means.

45. The data processing system as claimed in claim 39, wherein discrimination information indicating a presence/absence of the identification information is further recorded on the data recording medium.

46. An information providing method for duplicating at least digital data recorded on a data recording medium having recorded thereon the digital data including at least work data and having recorded thereon in advance of the work data identification information identifying an individual recording medium, and providing duplicated digital data, the method comprising the step of
  providing information obtained by adding information provider identification information to the duplicated digital data.

47. The information providing method as claimed in claim 46, wherein discrimination information indicating a presence/absence of the identification information is further recorded on the data recording medium.

48. An information transmitting device comprising:
  at least one terminal section for reproducing a recording medium having recorded thereon first digital data related to a work and second digital data including identification information identifying an individual recording medium and address data indicating a homepage address; and
  at least one server section connected to the terminal section via a communication channel and designated by the address data
  wherein the server section identifies the identification information of the recording medium supplied from at least the terminal section via the communication channel, and permits downloading of the digital data related to the work to the terminal section when the result of identification indicates that the terminal section is a predetermined kind of terminal section.

49. The information transmitting device as claimed in claim 48, wherein the server section permits downloading of the digital data related to the work to the terminal section when the result of identification of the identification information indicates that the terminal section is a normal terminal section.

50. The information transmitting device as claimed in claim 48, wherein the server section prohibits the terminal section from accessing the server section when a result of identification indicates that the terminal section is not a predetermined kind of terminal section.

51. The information transmitting device as claimed in claim 48, wherein the server section urges the terminal section to carry out an accounting when a result of identification indicates that the terminal section is a predetermined kind of terminal section.

52. The information transmitting device as claimed in claim 51, wherein the server section transmits data related to a key for decrypting an encryption of the first digital data to the terminal section when the accounting is carried out by the terminal section.

53. The information transmitting device as claimed in claim 52, wherein the terminal section decodes the transmitted data related to a key for decrypting the encryption on the basis of the identification information particular kind of to the medium.

54. An information transmitting method comprising the steps of:

transmitting identification information of a recording medium from at least one terminal section for reproducing the recording medium having recorded thereon first digital data related to a work and second digital data including at least identification information identifying an individual recording medium and address data indicating a homepage address, to a server section via a communication channel;

identifying the transmitted identification information by the server section; and permitting, by the server section, downloading of the digital data related to the work to the terminal section when a result of identification indicates that the terminal section is a predetermined kind of terminal section.

55. The information transmitting method as claimed in claim 54, wherein the server section transmits to the terminal section a transmission request for transmitting at least a part of the second digital data, after the result of identification of the identification information indicates that the terminal section is a predetermined kind of terminal section.

56. The information transmitting method as claimed in claim 55, wherein the server section at least causes the terminal section to carry out an alarm display when no response is returned from the terminal section with respect to the transmission request for transmitting a part of the second digital data.

57. The information transmitting method as claimed in claim 54, wherein the server section prohibits the terminal section from accessing the server section when the result of identification indicates that the terminal section is not a predetermined kind of terminal section.

58. The information transmitting method as claimed in claim 54, wherein the server section urges the terminal section to carry out accounting when the result of identification indicates that the terminal section is a predetermined kind of terminal section.

59. The information transmitting method as claimed in claim 57, wherein the server section transmits data related to a key for decrypting an encryption of the first digital data to the terminal section when accounting is carried out by the terminal section.

60. The information transmitting method as claimed in claim 59, wherein the terminal section decodes the transmitted data related to a key for decrypting the encryption on the basis of the identification information identifying the individual recording medium.

61. An information transmitting method comprising the steps of:

transmitting identification information of a recording medium from at least one terminal section for reproducing a duplicate recording medium duplicated from the recording medium having recorded thereon first digital data related to an encrypted work and second digital data including at least identification information identifying an individual recording medium, to a host section via a communication channel;

authenticating the transmitted identification information by the host section;

requesting the terminal section for accounting; and transmitting data related to a key for decrypting the encryption of the first digital data to the terminal section when the accounting is carried out.

62. The information transmitting method as claimed in claim 61, wherein the terminal section reproduces the first digital data of the duplicate recording medium on the basis of the transmitted data related to the key.

63. The information transmitting method as claimed in claim 62, wherein the terminal section decodes the transmitted data related to the key for decrypting the encryption on the basis of the identification information identifying the individual recording medium of the duplicate recording medium.

64. The information transmitting method as claimed in claim 61, wherein the host section totals the identification information identifying the individual recording medium of the recording medium transmitted from the terminal section and totals a quantity of duplication of each recording medium.

65. The information transmitting method as claimed in claim 64, wherein the host section calculates a distribution rate for distributing at least a part of a fee collected by the accounting to an owner of the recording medium.

66. An information transmitting method comprising the steps of:

downloading first digital data together with second digital data by at least one terminal section and duplicating the first digital data, the first digital data being duplicated from a recording medium having recorded thereon at least the first digital data related to an encrypted work and the second digital data including data identification information of at least the first digital data and identification information identifying an individual recording medium, the first digital data being laid open to the public so that the first digital data can be downloaded together with the second digital data to users via a communication channel;

transmitting the downloaded identification information of the recording medium together with the duplicated first digital data from the terminal section to a host section via the communication channel;

authenticating the transmitted identification information by the host section;

requesting the terminal section for an accounting; and transmitting data related to a key for decrypting the encryption of the first digital data to the terminal section when the accounting is carried out.

67. The information transmitting method as claimed in claim 66, wherein the terminal section reproduces the first digital data of the duplicate recording medium on the basis of the transmitted data related to the key.

68. The information transmitting method as claimed in claim 67, wherein the terminal section decodes the transmitted data related to the key for decrypting the encryption on the basis of the identification information identifying the individual recording medium of the duplicate recording medium.

69. The information transmitting method as claimed in claim 66, wherein the host section totals the identification information identifying the individual recording medium of the recording medium transmitted from the terminal section and totals a quantity of duplication of each recording medium.

70. The information transmitting method as claimed in claim 69, wherein the host section calculates a distribution rate for distributing at least a part of a fee collected by the accounting to an owner of the recording medium.

71. The information transmitting method as claimed in claim 66, wherein the accounting is carried out on the basis of the data identification information.

* * * * *

UNITED STATES PATENT AND TRADEMARK OFFICE
CERTIFICATE OF CORRECTION

| | | |
|---|---|---|
| PATENT NO. | : 7,072,260 B1 | Page 1 of 1 |
| APPLICATION NO. | : 09/830312 | |
| DATED | : July 4, 2006 | |
| INVENTOR(S) | : Yoichiro Sako et al. | |

It is certified that error appears in the above-identified patent and that said Letters Patent is hereby corrected as shown below:

On Title Page, delete "Apr. 4, 2001" and insert --Apr. 24, 2001--;

Column 2, line 26, delete "enable" and insert --enables--;

Column 9, line 33, delete "determined" and insert --determines--;

Column 11, line 41, delete "operation" and insert --operations--;

Column 13, line 66, delete "is outputted" and insert --are outputted--;

Column 14, line 1, delete "is supplied" and insert --are supplied--;

Column 15, line 49, delete "server is" and insert --server, is--;

Column 20, line 28, delete "te" and insert --the--;

Column 29, line 25, delete "digital recorded" and insert --digital data recorded--;

Column 30, line 64, delete "particular kind" and insert --particular to a kind--;

Column 30, line 65, delete "to"; and

Column 31, line 37, delete "57" and insert --58--.

Signed and Sealed this

Tenth Day of April, 2007

JON W. DUDAS
*Director of the United States Patent and Trademark Office*